(12) United States Patent
Nakada

(10) Patent No.: US 7,123,215 B2
(45) Date of Patent: Oct. 17, 2006

(54) GLASSES TYPE DISPLAY AND CONTROLLING METHOD THEREOF

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 498 days.

(21) Appl. No.: 10/721,319

(22) Filed: Nov. 26, 2003

(65) Prior Publication Data

US 2004/0104864 A1 Jun. 3, 2004

(30) Foreign Application Priority Data

Nov. 28, 2002 (JP) ............................. 2002-346315

(51) Int. Cl.
```
G09G 5/00    (2006.01)
H04M 15/00   (2006.01)
H04N 5/225   (2006.01)
G05B 11/01   (2006.01)
H04N 7/173   (2006.01)
```
(52) U.S. Cl. .................... 345/8; 345/2.1; 345/2.3; 345/211; 379/122; 379/322; 348/373; 700/11; 700/12; 700/22; 715/718; 715/727

(58) Field of Classification Search ........... 345/7–9, 345/1.3, 2.1–2.3, 207, 211–214, 376; 702/116, 702/125; 713/300, 310, 320; 700/11, 12, 700/17–22; 379/122, 142.15, 142.17, 322, 379/395.01; 715/718, 727, 747; 348/373, 348/375

See application file for complete search history.

(56) References Cited

U.S. PATENT DOCUMENTS

| | | | | |
|---|---|---|---|---|
| 5,635,948 A | * | 6/1997 | Tonosaki | 345/8 |
| 5,815,126 A | * | 9/1998 | Fan et al. | 345/8 |
| 5,835,083 A | * | 11/1998 | Nielsen et al. | 345/211 |
| 6,124,976 A | * | 9/2000 | Miyazaki | 359/630 |
| 6,734,845 B1 | * | 5/2004 | Nielsen et al. | 345/211 |
| 6,850,166 B1 | * | 2/2005 | Deeds | 340/635 |
| 2002/0149545 A1 | * | 10/2002 | Hanayama et al. | 345/7 |

FOREIGN PATENT DOCUMENTS

| | | |
|---|---|---|
| JP | 05-49165 A | 2/1993 |
| JP | 06-292104 A | 10/1994 |
| JP | 2002-125137 A | 4/2002 |

* cited by examiner

Primary Examiner—Henry N. Tran
(74) Attorney, Agent, or Firm—Sughrue Mion, PLLC

(57) ABSTRACT

A glasses type display that is connected to an information communication terminal via a wire line or a wireless line, in which the operation by the user is made simple by preventing error operation and the power consumption is decreased by not consuming the unnecessary power, is provided. The glasses type display provides lenses, a main frame, side frames, a microphone, a speaker(s), open and closed state detecting sensors, wearing state detecting sensors. When the user opened the side frames, the open and closed state detecting sensors react, and the wearing state detecting sensors become the on state. When the user put on the glasses type display, the lenses automatically become the on state by that the wearing state detecting sensors detected the wearing state. And when the reaction from a part of the wearing state detecting sensors was turned off, caused by some vibration, the lenses are not immediately turned off. Therefore, an error operation is avoided. When the side frames were closed, the lenses were turned off automatically by the operation of the open and closed state detecting sensors. Therefore, the unnecessary power consumption is avoided.

37 Claims, 21 Drawing Sheets

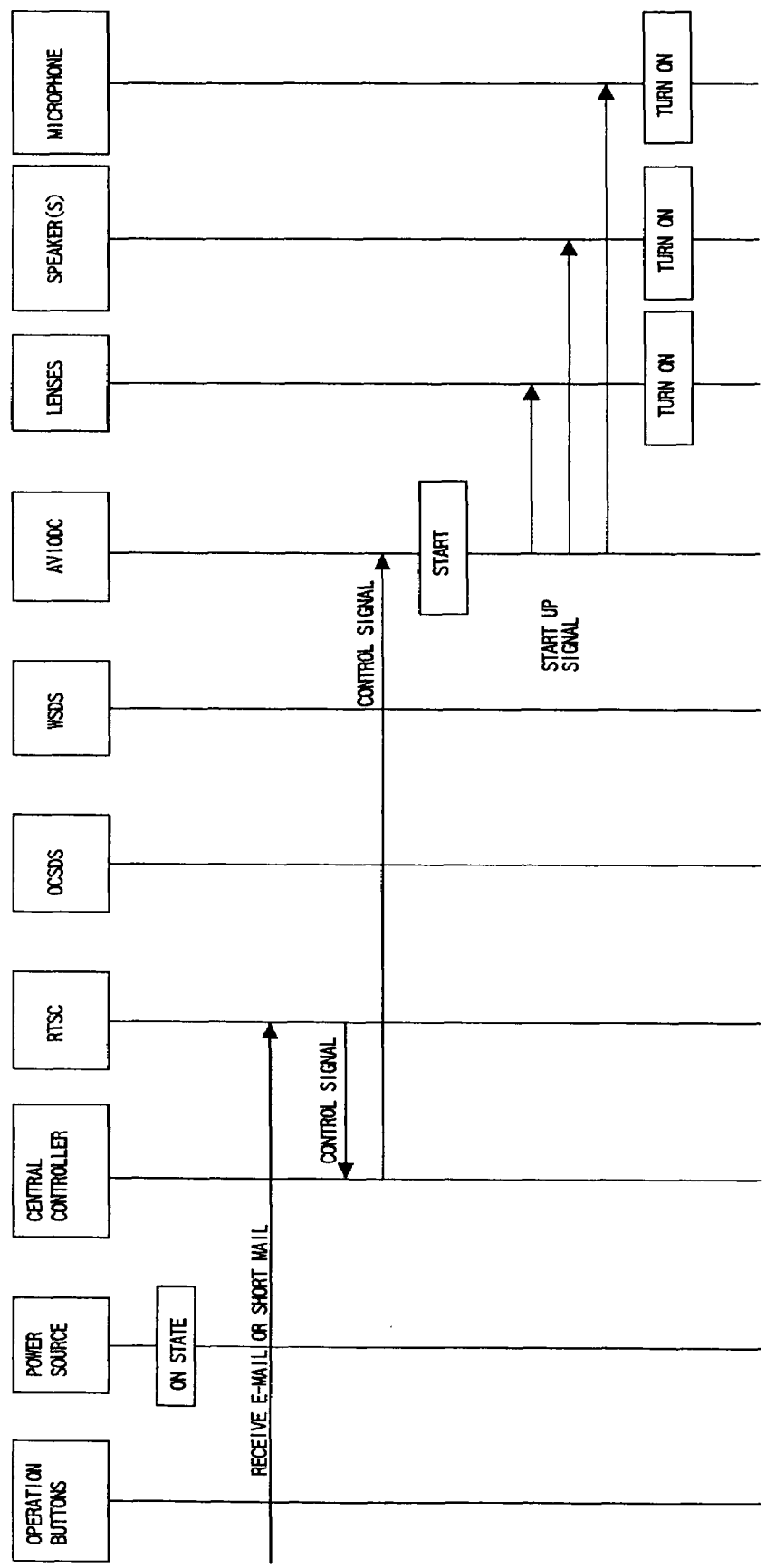

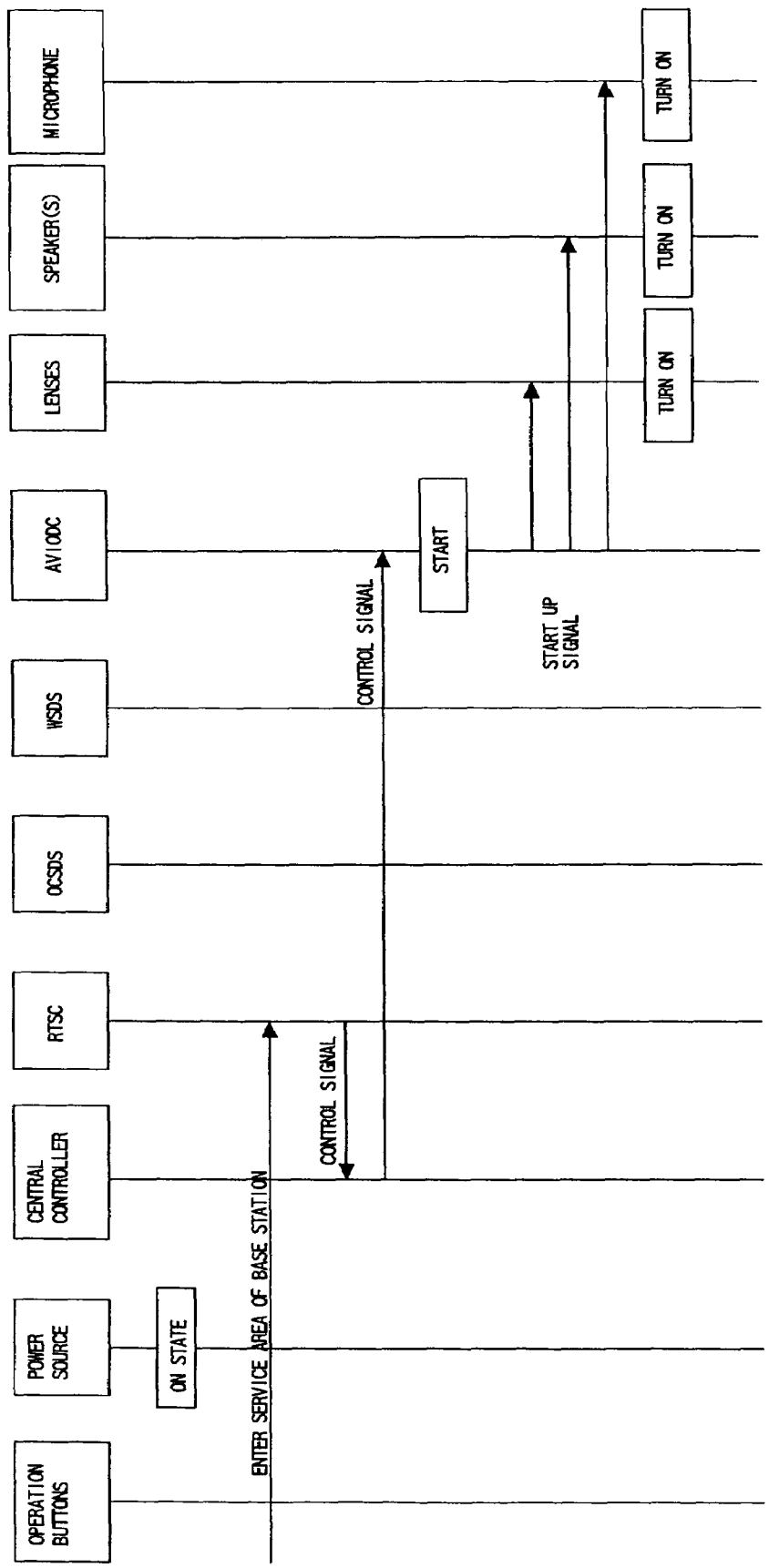

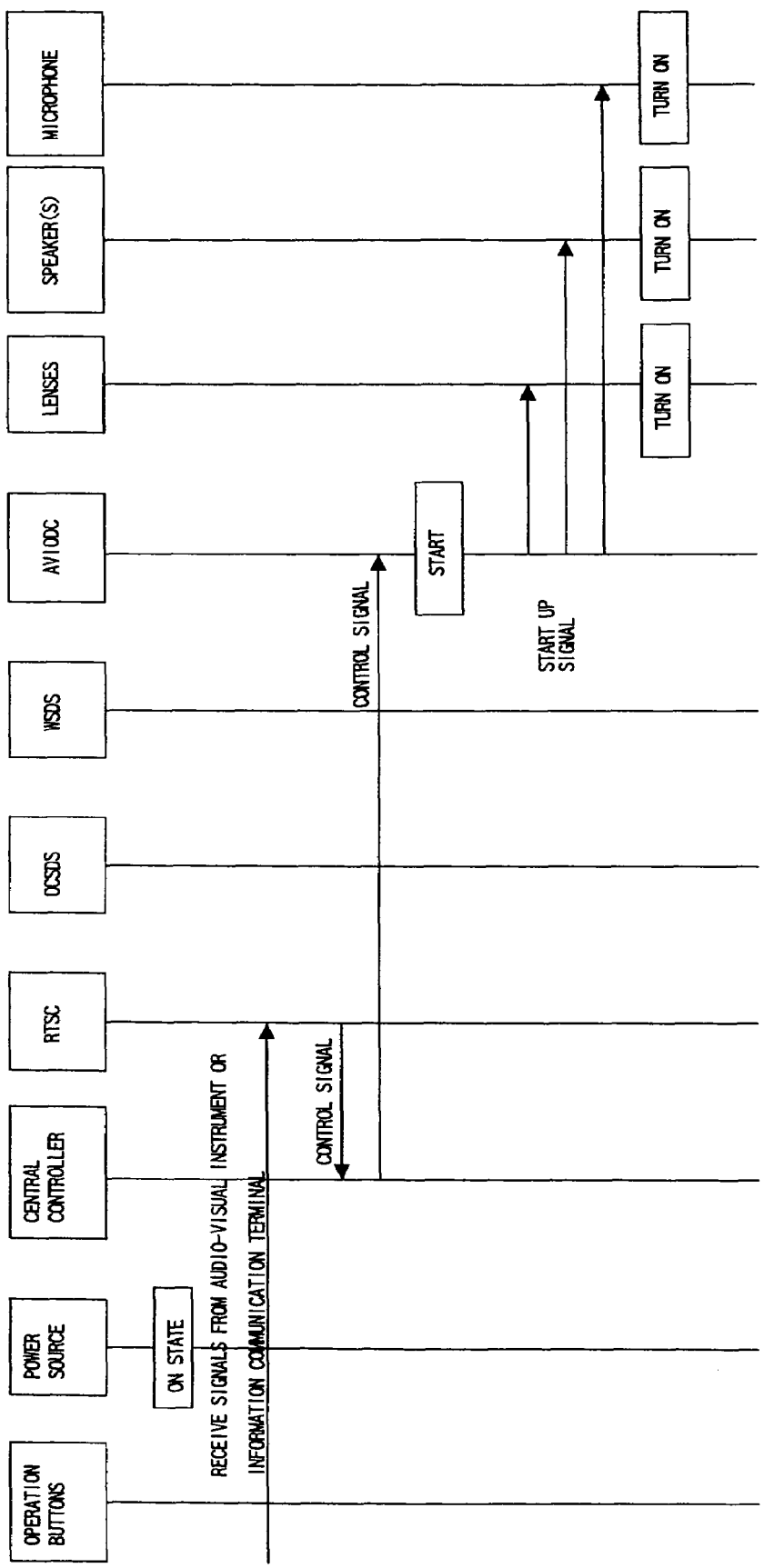

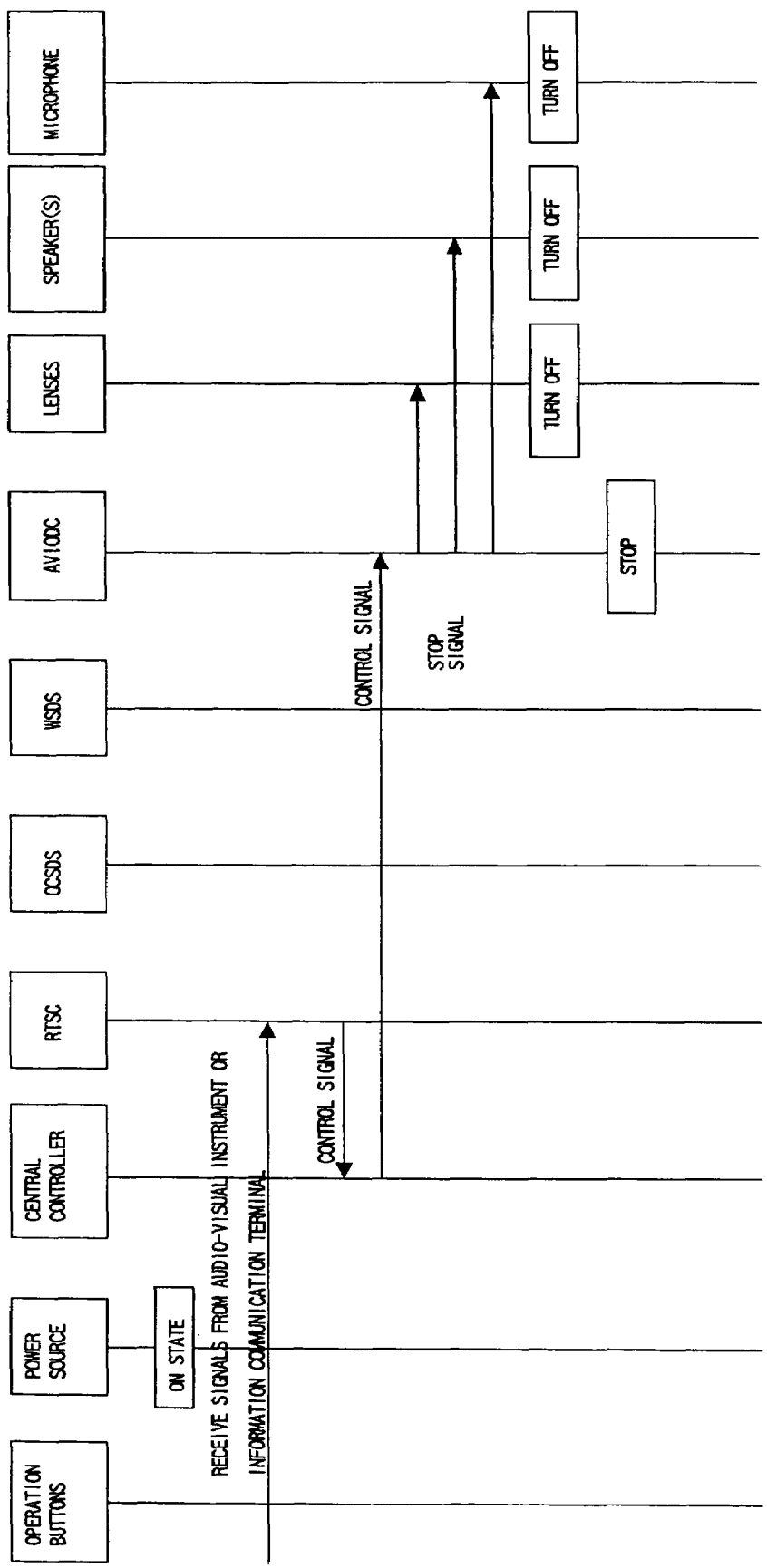

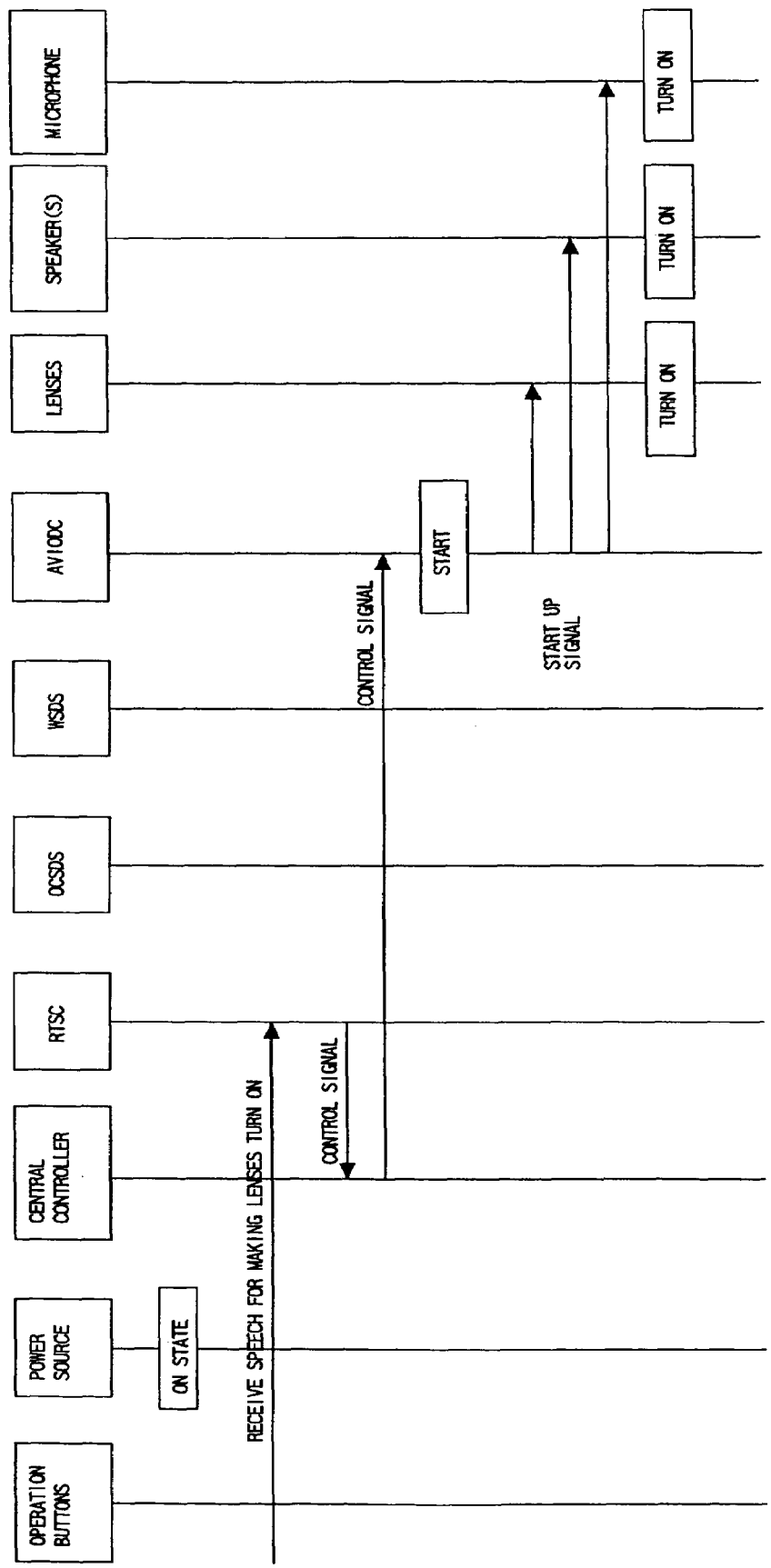

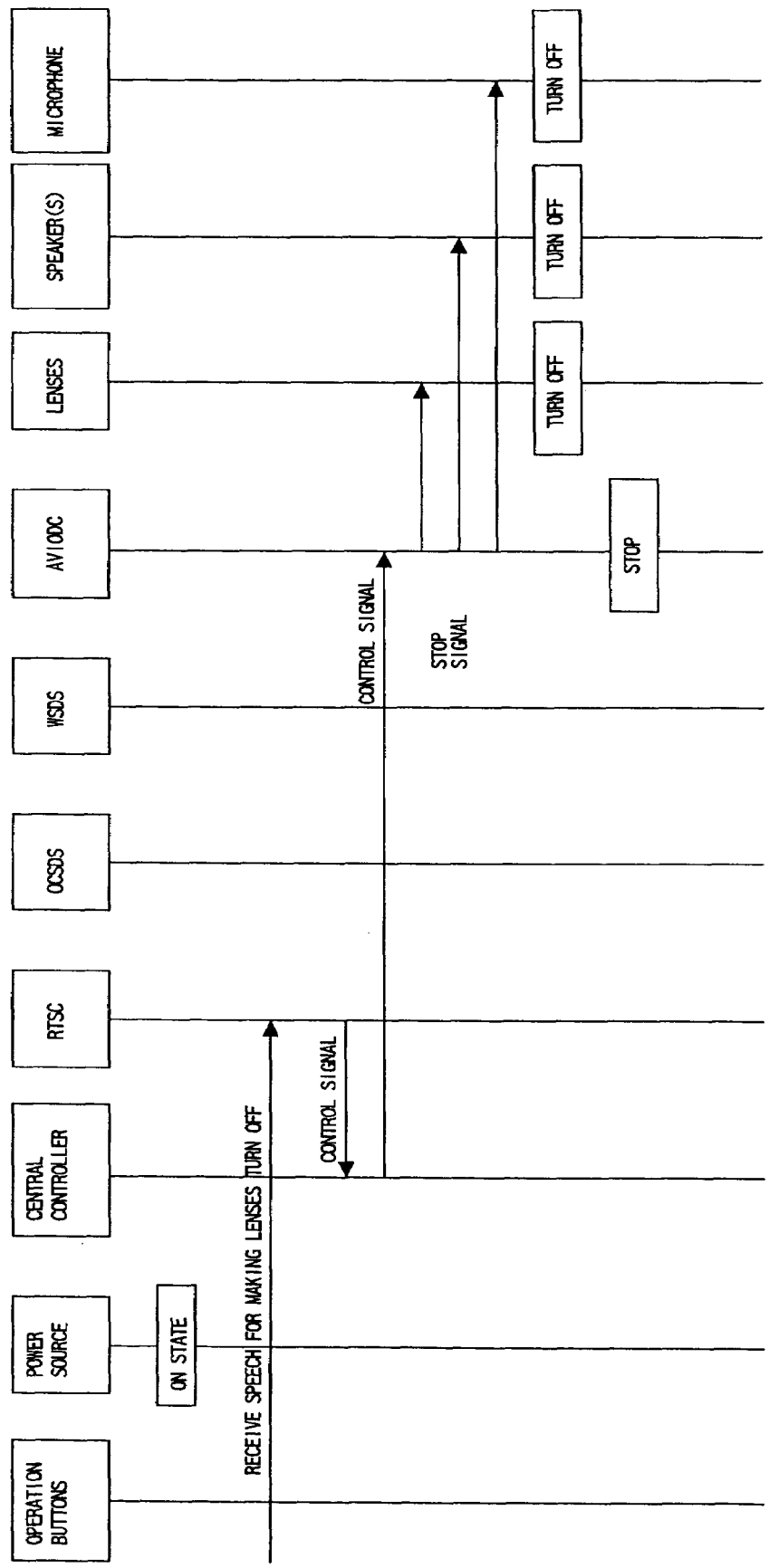

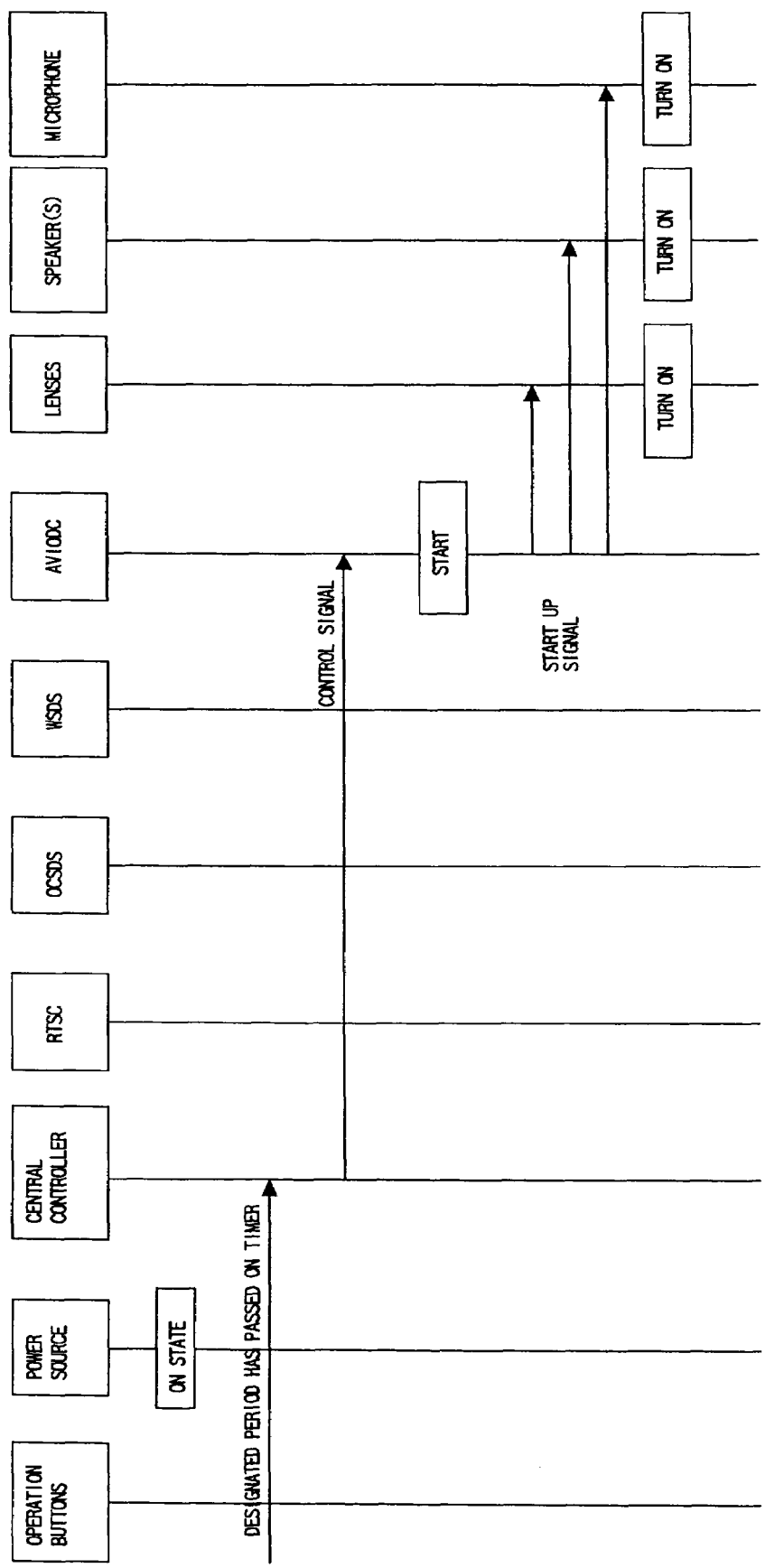

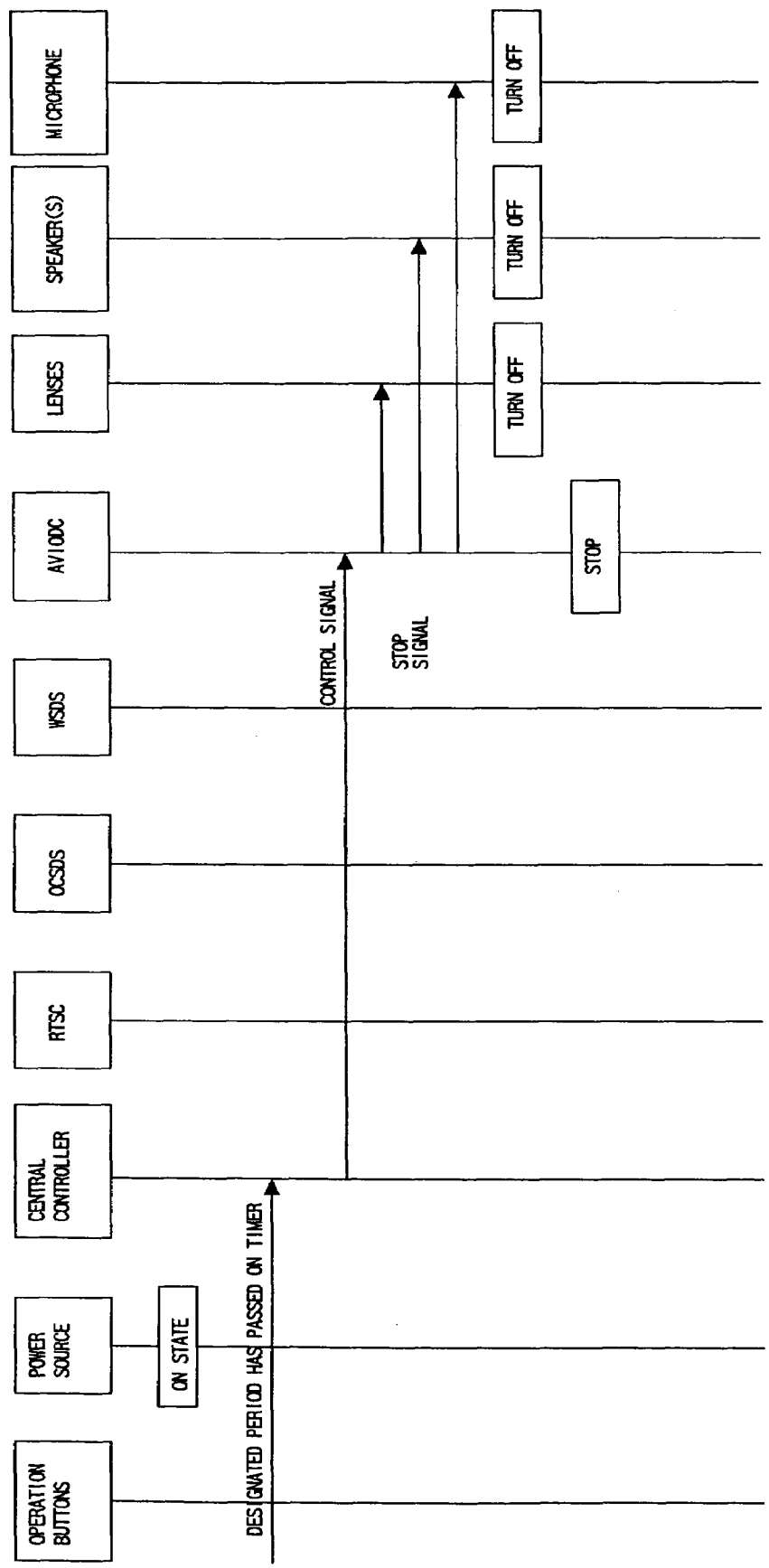

GLASSES TYPE DISPLAY AND CONTROLLING METHOD THEREOF

BACKGROUND OF THE INVENTION

The present invention relates to a glasses type display and a controlling method thereof, in which the glasses type display is used with an audio-visual instrument and an information communication instrument, and in which error operation is prevented and operation by the user is simplified and power consumption is decreased by without using the unnecessary power.

DESCRIPTION OF THE RELATED ART

Recently, a liquid crystal display using in a mobile communication terminal has been large sized and high quality, and this progress has been remarkable. Some mobile communication terminal provides a liquid crystal display of 2.2 inches in which the number of pixels is over 60 thousands. Furthermore, some mobile communication terminal provides an additional small liquid crystal display on the rear surface of the mobile communication terminal. However, the mobile communication terminal must be small sized, consequently, it has been difficult that a large sized and high quality liquid crystal display is used for the mobile communication terminal.

Under this situation, a glasses type display has been focused on. Now, the glasses type display has been marketed mainly for audio-visual instruments. However, the glasses type display is still large for the display of the mobile communication terminal and obstructs the view of the user for the outside. Consequently, it is difficult that the glasses type display is used for the mobile communication terminal. By the progress of the technology, if the view for the outside can be secured while the glasses type display is displaying information on the display, the mobile communication terminal can use the glasses type display whose size is remarkably large and whose quality is noticeably high.

When the glasses type display is used for the mobile communication terminal, there is a subject to be solved in addition to the small size and the securing the view. That is, at the mobile communication terminal, the usability must be secured and the unnecessary power consumption must be avoided.

For example, when a person called a user while the user was keeping the glasses type display in his/her bag, the user must pick up the glasses type display and put it on as soon as possible. However, at this time, when the user must push some buttons, the call may be disconnected. In order to solve this problem, when the glasses type display is worked fully by keeping it in the on state, the battery may be consumed soon. As the usability, the user must receive the phone call as soon as possible.

At the glasses type display for the audio-visual instruments, there are conventional technologies to save the power consumption.

As the first conventional technology, Japanese Patent Application Laid-Open No. 2002-125137 discloses a remote operation apparatus. This remote operation apparatus is used for a glasses type viewer being a monitor of audio-visual instruments. In this patent application, when a user views images by wearing the glasses type viewer on his/her head, in order not to be tired from viewing for a long time, after a certain period has passed, information for making the power turn off is automatically displayed on a monitor, and the power is turned off after the period has passed. This function in the remote operation apparatus can avoid the situation that the power is consumed for a long time by displaying the images.

As the second conventional technology, Japanese Patent Application Laid-Open No. HEI 5-49165 discloses a power on and off apparatus for a glasses type display. In this patent application, the state not using the glasses type display is detected by using a device for detecting light reflected from eyes of the user. This apparatus does not turn off the power when the device does not detect light reflected from the eyes for a short period of time such as blinks of the user. However, this apparatus turns off the power when the device does not detect light reflected from the eyes for a long period of time such as dozes of the user. With this, the power consumption is decreased without consuming the unnecessary power.

As the third conventional technology, Japanese Patent Application Laid-Open No. HEI 6-292104 discloses a small glasses type display. This small glasses type display provides a pressure sensor, which detects the wearing state of the display by the user, on the position where the nose of the user touches. When the user puts on the display, the pressure sensor detects the pressure and makes images display on the display, and when the user takes off the display, the power is turned off. With this, the power consumption is decreased by not consuming the unnecessary power.

However, at a system in which a glasses type display is used at a mobile communication terminal, the size of the mobile communication terminal is generally smaller than that of the audio-visual instrument. Therefore, when the conventional technologies are applied to the mobile communication terminal, there is a high possibility that the battery in the mobile communication terminal is soon dead. And the unnecessary power consumption may not be prevented by these conventional technologies.

Further, at the first conventional technology, when a certain time has passed, an alarm is simply displayed on the glasses type viewer. And at the second conventional technologies, the structure of the apparatus is complex, and when this technology is used, the usability for the mobile communication terminal may decrease.

At the third conventional technology, a simple structure, in which the pressure sensor for detecting the wearing state of the display is provided, is used, and it is possible to decrease the power consumption. However, it is required that the wearing state of the display must be detected precisely. That is, it is necessary that the pressure sensor precisely reacts to the wearing state of the display. Therefore, in case that the user uses the display outdoors, when the pressure sensor touched the nose of the user loosely, caused by the vibration at the time of walking, a problem happens. That is, in case that the user wants to continue viewing the images on the display, when the reaction from the pressure sensor has become bad, the power for the display is turned off. Consequently, an error operation occurs. Therefore, it is required that the display is not turned off soon after the pressure sensor temporarily became loose touching with the nose.

SUMMARY OF THE INVENTION

It is therefore an object of the present invention to provide a glasses type display and a glasses type display controlling method, in which the operation by the user is made simple by preventing error operation and the power consumption is decreased by not consuming the unnecessary power.

According to a first aspect of the present invention, for achieving the object mentioned above, there is provided a glasses type display, which is used with an information communication terminal by connecting with a wire line or a wireless line. The glasses type display provides an open and closed state detecting means that detects the open and closed state of side frames of the glasses type display, a wearing state detecting means that detects the wearing state of the glasses type display by a user, a displaying means that is disposed in a main frame of the glasses type display and displays images, a voice and sound outputting means that outputs voice and sound, a voice and sound inputting means that inputs voice and sound, and a timer that measures a designated period. And when a power source became the on state in the glasses type display, the glasses type display became a first state, in which the open and closed state detecting means is the on state, and the wearing state detecting means and the displaying means and the voice and sound outputting means and the voice and sound inputting means and the timer remain in the off state. And at the first state, when the open and closed state detecting means detected the open state of the side frames, the glasses type display became a second state, in which the wearing state detecting means is the on state, and the displaying means and the voice and sound outputting means and the voice and sound inputting means and the timer remain in the off state. And at the second state, when the user put on the glasses type display and the wearing state detecting means detected the wearing state of the glasses type display and a predetermined displaying condition was satisfied, the glasses type display became a third state, in which the displaying means and the voice and sound outputting means and the voice and sound inputting means are the on state and the timer remains in the off state. And at the third state, when the predetermined displaying condition has not been satisfied, the glasses type display became a fourth state, in which the timer starts measuring the designated period.

According to a second aspect of the present invention, in the first aspect, at the fourth state, when the predetermined displaying condition was satisfied before finishing measuring the designated period by the timer, the fourth state changes to the third state.

According to a third aspect of the present invention, in the first aspect, at the fourth state, when the predetermined displaying condition was not satisfied at the time when the timer finished measuring the designated period, the fourth state changes to the second state.

According to a fourth aspect of the present invention, in any of the first to third aspects, the wearing state detecting means provides plural sensors for detecting the wearing state of the glasses type display, and the predetermined displaying condition is satisfied at the time when the reacted number of the sensors is a predetermined number or more in the sensors.

According to a fifth aspect of the present invention, in the first aspect, at the second state, when the open and closed state detecting means detected the closed state of the side frames, the second state changes to the first state.

According to a sixth aspect of the present invention, in the first aspect, at the third state, when the open and closed state detecting means detected the closed state of the side frames, the third state changes to the first state.

According to a seventh aspect of the present invention, in the first aspect, at the fourth state, when the open and closed state detecting means detected the closed state of the side frames, the fourth state changes to the first state.

According to an eighth aspect of the present invention, in the first aspect, at the second state, the timer is started to measure the designated period, and when the timer finished measuring the designated period, regardless of the predetermined displaying condition, the displaying means and the voice and sound outputting means and the voice and sound inputting means are turned on.

According to a ninth aspect of the present invention, in the first aspect, at the third state, the timer is started to measure the designated period, and when the timer finished measuring the designated period, the displaying means and the voice and sound outputting means and the voice and sound inputting means are turned off.

According to a tenth aspect of the present invention, in any of the first to ninth aspects, the information communication terminal is a mobile communication terminal and the glasses type display is in the communication state with the mobile communication terminal. And when the mobile communication terminal received a call from another mobile communication terminal, regardless of the predetermined displaying condition, the displaying means and the voice and sound outputting means and the voice and sound inputting means are turned on.

According to an eleventh aspect of the present invention, in any of the first to ninth aspects, the information communication terminal is a mobile communication terminal and the glasses type display is in the communication state with the mobile communication terminal. And when the mobile communication terminal ended a speech with another mobile communication terminal, the displaying means and the voice and sound outputting means and the voice and sound inputting means are turned off.

According to a twelfth aspect of the present invention, in any of the first to ninth aspects, the information communication terminal is a mobile communication terminal and the glasses type display is in the communication state with the mobile communication terminal. And when the mobile communication terminal received an e-mail from another mobile communication terminal, regardless of the predetermined displaying condition, the displaying means and the voice and sound outputting means and the voice and sound inputting means are turned on.

According to a thirteenth aspect of the present invention, in any of the first to ninth aspects, the information communication terminal is a mobile communication terminal and the glasses type display is in the communication state with the mobile communication terminal. And when the mobile communication terminal entered a service area for mobile communication terminals, regardless of the predetermined displaying condition, the displaying means and the voice and sound outputting means and the voice and sound inputting means are turned on.

According to a fourteenth aspect of the present invention, in any of the first to ninth aspects, the information communication terminal is a mobile communication terminal and the glasses type display is in the communication state with the mobile communication terminal. And when the user of the mobile communication terminal made a specified speech, it was assumed that the predetermined displaying condition was satisfied by recognizing the specified speech, and the displaying means and the voice and sound outputting means and the voice and sound inputting means are turned on.

According to a fifteenth aspect of the present invention, in any of the first to ninth aspects, the information communication terminal is a mobile communication terminal and the glasses type display is in the communication state with the mobile communication terminal. And when the user of the mobile communication terminal made another specified speech, by recognizing another specified speech, the displaying means and the voice and sound outputting means and the voice and sound inputting means are turned off.

According to a sixteenth aspect of the present invention, in any of the first to ninth aspects, the information communication terminal is a communication terminal, which provides an information receiving means for receiving information from the outside directly, and the glasses type display is in the communication state with the communication terminal. And when the glasses type display received a designated signal from the information terminal, it was assumed that the predetermined displaying condition was satisfied, and the displaying means and the voice and sound outputting means and the voice and sound inputting means are turned on.

According to a seventeenth aspect of the present invention, in any of the first to ninth aspects, the information communication terminal is a communication terminal, which provides an information receiving means for receiving information from the outside directly, and the glasses type display is in the communication state with the communication terminal. And when the glasses type display received another designated signal from the information terminal, the displaying means and the voice and sound outputting means and the voice and sound inputting means are turned off.

According to an eighteenth aspect of the present invention, in any of the first to ninth aspects, the information communication terminal is an audio-visual instrument, which provides an information receiving means for receiving information from the outside directly, and the glasses type display is in the communication state with the audio-visual instrument. And when the glasses type display received a designated signal from the audio-visual instrument, it was assumed that the predetermined displaying condition was satisfied, and the displaying means and the voice and sound outputting means and the voice and sound inputting means are turned on.

According to a nineteenth aspect of the present invention, in any of the first to ninth aspects, the information communication terminal is an audio-visual instrument, which provides an information receiving means for receiving information from the outside directly, and the glasses type display is in the communication state with the audio-visual instrument. And when the glasses type display received another designated signal from the audio-visual instrument, the displaying means and the voice and sound outputting means and the voice and sound inputting means are turned off. Or when signals from the audio-visual instrument have not been received at the glasses type display, the displaying means and the voice and sound outputting means and the voice and sound inputting means are turned off.

According to a twentieth aspect of the present invention, in any of the first to nineteenth aspects, the glasses type display provides the information communication terminal inside of the glasses type display, instead of connecting to the information communication terminal.

According to a twenty-first aspect of the present invention, for achieving the object mentioned above, there is provided a glasses type display controlling method in a glasses type display, which is used with an information communication terminal by connecting with a wire line or a wireless line. And the glasses type display provides an open and closed state detecting means that detects the open and closed state of side frames of the glasses type display, a wearing state detecting means that detects the wearing state of the glasses type display by a user, a displaying means that is disposed in a main frame of the glasses type display and displays images, a voice and sound outputting means that outputs voice and sound, a voice and sound inputting means that inputs voice and sound, and a timer that measures a designated period. And the glasses type display controlling method provides the steps of, making the glasses type display a first state, in which the open and closed state detecting means is the on state, and the wearing state detecting means and the displaying means and the voice and sound outputting means and the voice and sound inputting means and the timer remain in the off state, when a power source became the on state in the glasses type display, making the glasses type display a second state, in which the wearing state detecting means is the on state, and the displaying means and the voice and sound outputting means and the voice and sound inputting means and the timer remain in the off state, when the open and closed state detecting means detected the open state of the side frames at the first state, making the glasses type display a third state, in which the displaying means and the voice and sound outputting means and the voice and sound inputting means are the on state and the timer remains in the off state, when the user put on the glasses type display and the wearing state detecting means detected the wearing state of the glasses type display and a predetermined displaying condition was satisfied at the second state, and making the glasses type display a fourth state, in which the timer starts measuring the designated period, when the predetermined displaying condition has not been satisfied at the third state.

According to a twenty-second aspect of the present invention, in the twenty-first aspect, the glasses type display controlling method further provides the steps of, changing the fourth state to the third state, when the predetermined displaying condition was satisfied before finishing measuring the designated period by the timer at the fourth state, and changing the fourth state to the second state, when the predetermined displaying condition was not satisfied at the time when the timer finished measuring the designated period at the fourth state.

According to a twenty-third aspect of the present invention, in the twenty-first or twenty-second aspect, the wearing state detecting means provides plural sensors for detecting the wearing state of the glasses type display, and the predetermined displaying condition is satisfied at the time when the reacted number of the sensors is a predetermined number or more in the sensors.

According to a twenty-fourth aspect of the present invention, in the twenty-first aspect, the glasses type display controlling method further provides the steps of, changing the second state to the first state, when the open and closed state detecting means detected the closed state of the side frames at the second state, changing the third state to the first state, when the open and closed state detecting means detected the closed state of the side frames at the third state, and changing the fourth state to the first state, when the open and closed state detecting means detected the closed state of the side frames at the fourth state.

According to a twenty-fifth aspect of the present invention, in the twenty-first aspect, the glasses type display controlling method further provides the steps of, starting the timer to measure the designated period at the second state, and turning on the displaying means and the voice and sound outputting means and the voice and sound inputting means, by assuming that the predetermined displaying condition was satisfied, when the timer finished measuring the designated period.

According to a twenty-sixth aspect of the present invention, in the twenty-first aspect, the glasses type display controlling method further provides the steps of, starting the timer to measure the designated period at the third state, and turning off the displaying means and the voice and sound outputting means and the voice and sound inputting means, when the timer finished measuring the designated period.

According to a twenty-seventh aspect of the present invention, in any of the twenty-first to twenty-sixth aspects, the information communication terminal is a mobile communication terminal and the glasses type display is in the communication state with the mobile communication terminal. And when the mobile communication terminal received a call from another mobile communication terminal, regardless of the predetermined displaying condition, the displaying means and the voice and sound outputting means and the voice and sound inputting means are turned on.

According to a twenty-eighth aspect of the present invention, in any of the twenty-first to twenty-sixth aspects, the information communication terminal is a mobile communication terminal and the glasses type display is in the communication state with the mobile communication terminal. And when the mobile communication terminal ended a speech with another mobile communication terminal, the displaying means and the voice and sound outputting means and the voice and sound inputting means are turned off.

According to a twenty-ninth aspect of the present invention, in any of the twenty-first to twenty-sixth aspects, the information communication terminal is a mobile communication terminal and the glasses type display is in the communication state with the mobile communication terminal. And when the mobile communication terminal received an e-mail from another mobile communication terminal, regardless of the predetermined displaying condition, the displaying means and the voice and sound outputting means and the voice and sound inputting means are turned on.

According to a thirtieth aspect of the present invention, in any of the twenty-first to twenty-sixth aspects, the information communication terminal is a mobile communication terminal and the glasses type display is in the communication state with the mobile communication terminal. And when the mobile communication terminal entered a service area for mobile communication terminals, regardless of the predetermined displaying condition, the displaying means and the voice and sound outputting means and the voice and sound inputting means are turned on.

According to a thirty-first aspect of the present invention, in any of the twenty-first to twenty-sixth aspects, the information communication terminal is a mobile communication terminal and the glasses type display is in the communication state with the mobile communication terminal. And when the user of the mobile communication terminal made a specified speech, it was assumed that the predetermined displaying condition was satisfied by recognizing the specified speech, and the displaying means and the voice and sound outputting means and the voice and sound inputting means are turned on.

According to a thirty-second aspect of the present invention, in any of the twenty-first to twenty-sixth aspects, the information communication terminal is a mobile communication terminal and the glasses type display is in the communication state with the mobile communication terminal. And when the user of the mobile communication terminal made another specified speech, by recognizing another specified speech, the displaying means and the voice and sound outputting means and the voice and sound inputting means are turned off.

According to a thirty-third aspect of the present invention, in any of the twenty-first to twenty-sixth aspects, the information communication terminal is a communication terminal, which provides an information receiving means for receiving information from the outside directly, and the glasses type display is in the communication state with the communication terminal. And when the glasses type display received a designated signal from the information terminal, it was assumed that the predetermined displaying condition was satisfied, and the displaying means and the voice and sound outputting means and the voice and sound inputting means are turned on.

According to a thirty-fourth aspect of the present invention, in any of the twenty-first to twenty-sixth aspects, the information communication terminal is a communication terminal, which provides an information receiving means for receiving information from the outside directly, and the glasses type display is in the communication state with the communication terminal. And when the glasses type display received another designated signal from the information terminal, the displaying means and the voice and sound outputting means and the voice and sound inputting means are turned off.

According to a thirty-fifth aspect of the present invention, in any of the twenty-first to twenty-sixth aspects, the information communication terminal is an audio-visual instrument, which provides an information receiving means for receiving information from the outside directly, and the glasses type display is in the communication state with the audio-visual instrument. And when the glasses type display received a designated signal from the audio-visual instrument, it was assumed that the predetermined displaying condition was satisfied, and the displaying means and the voice and sound outputting means and the voice and sound inputting means are turned on.

According to a thirty-sixth aspect of the present invention, in any of the twenty-first to twenty-sixth aspects, the information communication terminal is an audio-visual instrument, which provides an information receiving means for receiving information from the outside directly, and the glasses type display is in the communication state with the audio-visual instrument. And when the glasses type display received another designated signal from the audio-visual instrument, the displaying means and the voice and sound outputting means and the voice and sound inputting means are turned off. Or when signals from the audio-visual instrument have not been received at the glasses type display, the displaying means and the voice and sound outputting means and the voice and sound inputting means are turned off.

According to a thirty-seventh aspect of the present invention, in any of the twenty-first to thirty-sixth aspects, the glasses type display provides the information communication terminal inside of the glasses type display, instead of connecting to the information communication terminal.

BRIEF DESCRIPTION OF THE DRAWINGS

The objects and features of the present invention will become more apparent from the consideration of the following detailed description taken in conjunction with the accompanying drawings in which:

FIG. 14 is a sequence chart showing the operation sequence at a fourth embodiment of the present invention;

FIG. 15 is a sequence chart showing the operation sequence at a fifth embodiment of the present invention;

FIG. 16 is a sequence chart showing the first operation sequence at a sixth embodiment of the present invention;

FIG. 17 is a sequence chart showing the second operation sequence at the sixth embodiment of the present invention;

FIG. 18 is a sequence chart showing the first operation sequence at a tenth embodiment of the present invention;

FIG. 19 is a sequence chart showing the second operation sequence at the tenth embodiment of the present invention;

FIG. 20 is a sequence chart showing the operation sequence at an eleventh embodiment of the present invention; and FIG. 21 is a sequence chart showing the operation sequence at a twelfth embodiment of the present invention.

DESCRIPTION OF THE PREFERRED EMBODIMENTS

Figure 1:
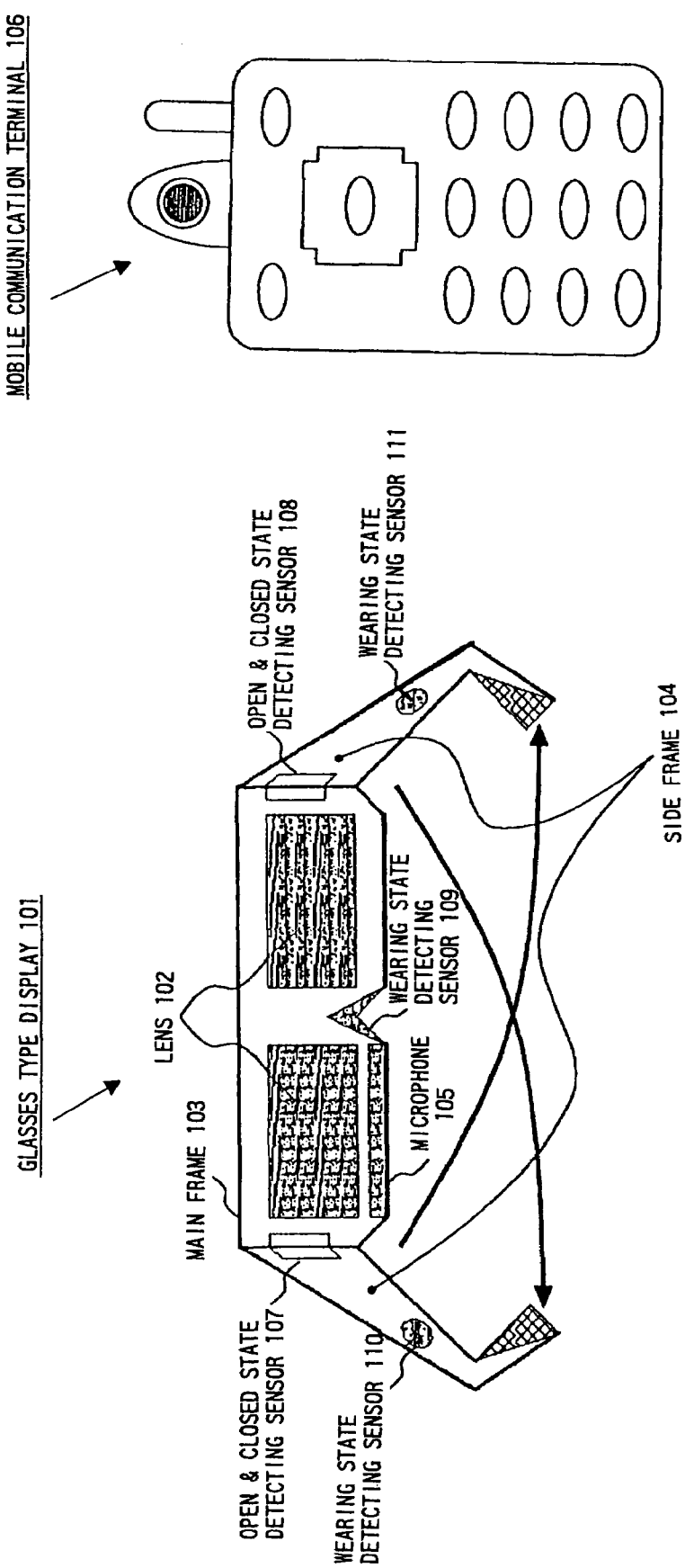
FIG. 1 is a diagram showing a mobile communication terminal system composed of a glasses type display and a mobile communication terminal at embodiments of the present invention.

Referring now to the drawings, embodiments of the present invention are explained in detail.

FIG. 1 is a diagram showing a mobile communication terminal system composed of a glasses type display and a mobile communication terminal at the embodiments of the present invention. As shown in FIG. 1, the mobile communication terminal system provides a glasses type display 101 and a mobile communication terminal 106.

The glasses type display 101 provides lenses 102, a main frame 103, side frames 104, a microphone 105, open and closed state detecting sensors 107 and 108, wearing state detecting sensors 109, 110 and 111, and a speaker(s) (not shown). Images are displayed on the lenses 102. The main frame 103 provides an audio and video input and output data controller (not shown). Side frames 104 provides operation buttons (not shown), a power source (not shown), a received and transmitting signal controller (not shown), a central controller (not shown), and a speaker(s) (not shown). The lenses 102 are made of a half transmission type display and the user can view not only the images on the display but also the outside scene.

The open and closed state detecting sensors 107 and 108 are positioned at hinges that connect the main frame 103 with the side frames 104, and detect the open and closed state of glasses type display 101. The wearing state detecting sensor 109 is positioned at the nose pad of the main frame 103. The wearing state detecting sensors 110 and 111 are positioned on the side frames 104. The wearing state detecting sensors 109, 110 and 111 detect the state that the user is wearing the glasses type display 101.

The mobile communication terminal 106 provides input buttons, a camera(s), a communication function with base stations, a communication function with the glasses type display 101. The communication between the glasses type display 101 and the mobile communication terminal 106 can be executed by a wire line or a wireless line, however, at the embodiments of the present invention, a wireless communication based on the Bluetooth standard is assumed.

Figure 2:
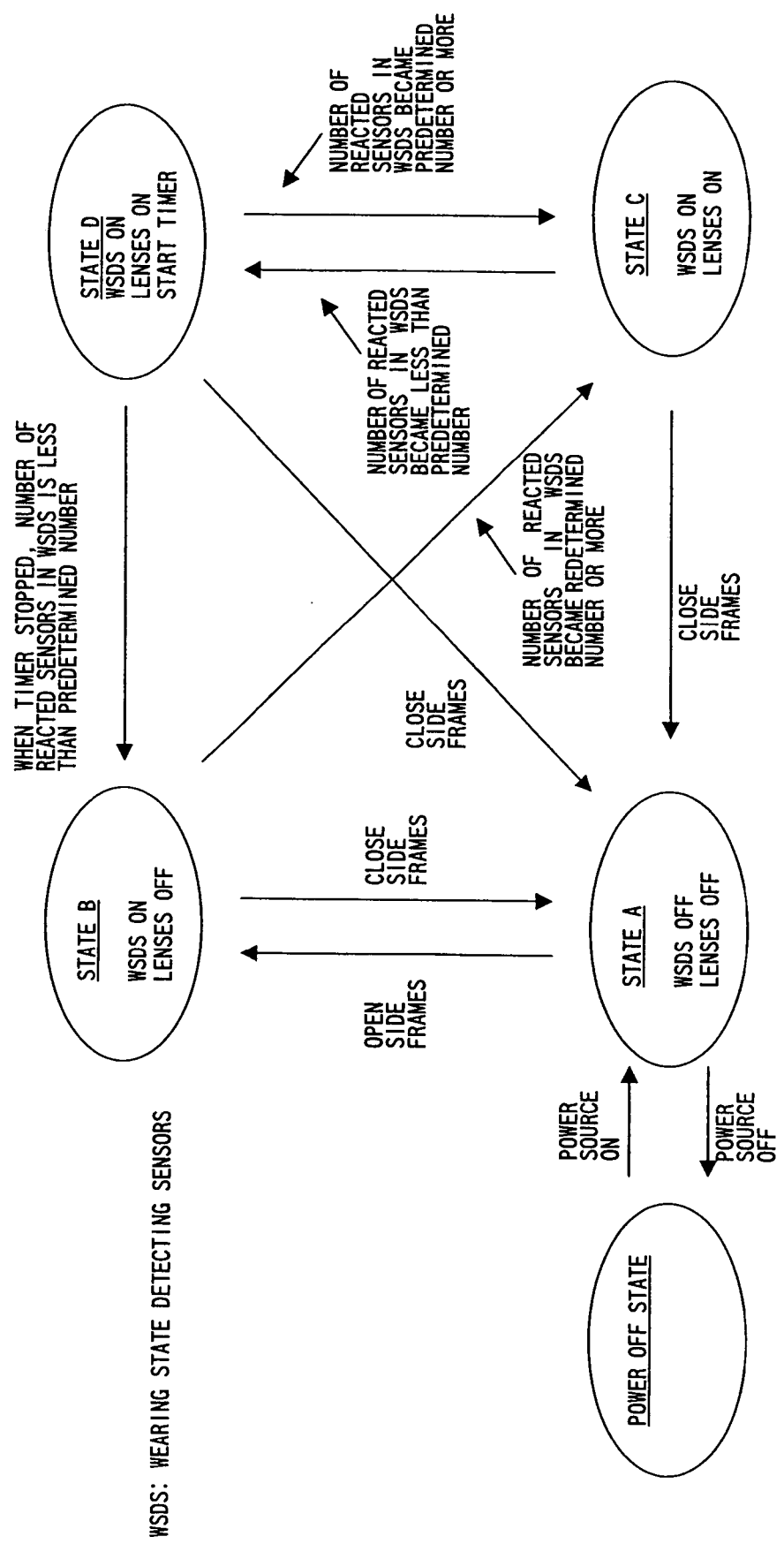
FIG. 2 is a diagram showing states of a glasses type display at the embodiments of the present invention.

FIG. 2 is a diagram showing states of the glasses type display 101 at the embodiments of the present invention. These states show a power off state, states of the wearing state detecting sensors 109, 110 and 111, and states of the lenses 102 of the glasses type display 101. In FIG. 2, the power off state and states A, B, C, and D are shown.

The power off state signifies a state that the power source is in the off state.

The state A signifies a state that the power has been supplied to the open and closed state detecting sensors 107 and 108 by turning on the power source at the power off state. Further, at this state A, the power has been supplied to the central controller, the received and transmitting signal controller. At this state A, the wearing state detecting sensors 109, 110 and 111 are still in the off state and the images on the lenses 102 are also in the off state.

The state B signifies a state that the side frames 104 were opened in the right and left directions at the state A. At this state B, the wearing state detecting sensors 109, 110 and 111 become the on state by the trigger of the reaction of the open and closed state detecting sensors 107 and 108, but the images on the lenses 102 are still in the off state.

The state C signifies a state that the number of the reacted sensors in the wearing state detecting sensor 109, 110 and 111 is a predetermined number or more at the state B. At this state C, the lenses 102 are first turned on, and images and a menu screen image are displayed on the lenses 102. In this, the predetermined number can be decided arbitrarily, however, the predetermined number is at least one in the three wearing state detecting sensors 109, 110 and 111.

As mentioned above, the state B is provided before the state C in which the images are displayed on the lenses 102. That is, at the time only when the side frames 104 are opened and the number of the reacted sensors in the wearing state detecting sensors 109, 110, and 111 is the predetermined number or more, the images are displayed on the lenses 102. In case that the user is walking with the glasses type display 101 in his/her bag, even when the side frames 104 are opened caused by the vibration, since the wearing state detecting sensors 109, 110 and 111 do not react, the lenses 102 do not become the on state. Consequently, the unnecessary power consumption by an error operation can be prevented.

The state D signifies a state that the number of the reacted sensors in the wearing state detecting sensors 109, 110 and 111 became less than the predetermined number at the state C. That is, at the state C, when a part of sensors in the wearing state detecting sensor 109, 110 and 111 has not reacted, and the number of the reacted sensors became less than the predetermined number, the state C does not change to the state B and changes to the state D and a timer is started up. When the reaction from the wearing state detecting sensors 109, 110 and 111 recovered before the timer stops, the state D changes to the state C again and the timer is stopped automatically. But, when the reaction from the wearing state detecting sensors 109, 110 and 111 has not recovered after the timer stopped, the state D changes to the state B and the images on the lenses 102 becomes the off state. At this state D, the wearing state detecting sensors 109, 110 and 111 are in the on state, but the reacted number in the wearing state detecting sensors 109, 110 and 111 is less than the predetermined number, and the images on the lenses 102 are in the on state, and the timer is started up.

As mentioned above, the state D is provided, therefore, even when the reaction from the wearing state detecting sensors 109, 110 and 111 is stopped temporarily caused by the vibration at the time of walking, an error operation, which the images on the display are turned off immediately, can be avoided. Further, if the user leaves the on state of the lenses 102 as it is, the state D is changed to the state B after the timer stopped, and the images on the display is turned off. Therefore, the unnecessary power consumption can be avoided.

Further, when the side frames 104 are closed, the state returns to the state A from any of the states B, C, and D. That is, the images on the display can be turned off and the wearing state detecting sensors 109, 110 and 111 can be turned off by closing the side frames 104.

Figure 3:
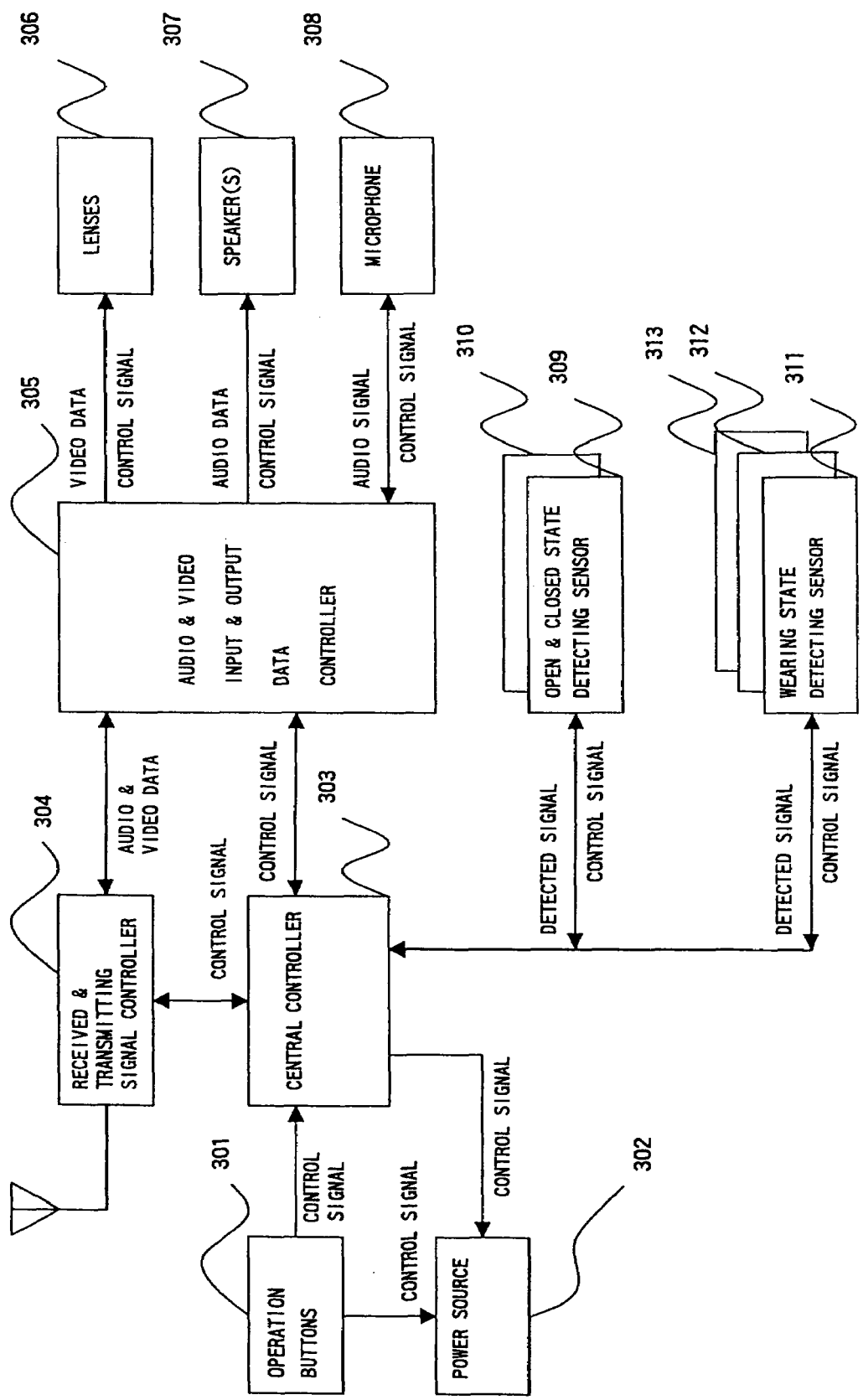
FIG. 3 is a block diagram showing the structure processing signals and data in the glasses type display shown in FIG. 1.

FIG. 3 is a block diagram showing the structure processing signals and data in the glasses type display 101 shown in FIG. 1. As shown in FIG. 3, the structure processing signals and data in the glasses type display 101 provides operation buttons 301, a power source 302, a central controller 303, a received and transmitting signal controller 304, an audio and video input and output data controller 305, lenses 306, a speaker(s) 307, a microphone 308, open and closed state detecting sensors 309 and 310, a wearing state detecting sensors 311, 312 and 313.

The operation buttons 301, the power source 302, the central controller 303, the received and transmitting signal controller 304, and the speaker(s) 307 are provided in the side frames 104 shown in FIG. 1. The audio and video input and output data controller 305 is provided in the main frame 103. The lenses 306, the microphone 308, the open and closed state detecting sensors 309 and 310, the wearing state detecting sensors 311, 312 and 313 are respectively equal to the lenses 102, the microphone 105, the open and closed state detecting sensors 107 and 108, the wearing state detecting sensors 109, 110 and 111 shown in FIG. 1.

The user of the glasses type display 101 switches on/off the power source 302 by operating the operation buttons 301 in the side frames 104.

The power source 302 supplies power or stops supplying power to the glasses type display 101 by the direct operation of the operation buttons 301 by the user, and also stops supplying power to the glasses type display 101 by the indirect operation using the mobile communication terminal 106.

The central controller 303 sends a control signal for starting up or stopping to the power source 302, the audio and video input and output data controller 305, the open and closed state detecting sensors 309 and 310, the wearing state detecting sensors 311, 312 and 313, by receiving a control signal for starting up or stopping from the operation buttons 301. The central controller 303 receives control signals such as a starting up signal, a stopping signal and other control signals from the received and transmitting signal controller 304, and also sends these signals to the received and transmitting signal controller 304. Further, the central controller 303 receives detected signals from the open and closed state detecting sensors 309 and 310, and from the wearing state detecting sensors 311, 312 and 313. The central controller 303 provides a time limit type timer, and the timer starts up at the time when the state became the state D shown in FIG. 2.

The received and transmitting signal controller 304 provides an antenna that the glasses type display 101 communicates with the mobile communication terminal 106. And the received and transmitting signal controller 304 sends control signals to the central controller 303 and receives control signals from the central controller 303. The received and transmitting signal controller 304 sends audio and video data to the audio and video input and output data controller 305, and receives audio and video data from the audio and video input and output data controller 305. Further, the received and transmitting signal controller 304 transmits the audio and video data to an external instrument such as the mobile communication terminal 106 and receives the audio and video data from the external instrument.

The audio and video input and output data controller 305 starts up by receiving the starting up control signal from the central controller 303, and exchanges the audio and video data with the received and transmitting signal controller 304. And the audio and video input and output data controller 305 controls the lenses 306 by sending a control signal so that the lenses 306 can receive the video data. And also the audio and video input and output data controller 305 controls the speaker(s) 307 by sending a control signal so that the speaker(s) 307 can receive the audio data. Further, the audio and video input and output data controller 305 controls the microphone 308 by sending a control signal so that the microphone 308 can send audio signals.

The lenses 306 is controlled to be turned on/off by receiving the control signal from the audio and video input and output data controller 305, and display images by receiving the video data to be displayed from the audio and video input and output data controller 305 when the control signal indicates ON.

The speaker(s) 307 is controlled to be turned on/off by receiving the control signal from the audio and video input and output data controller 305, and outputs speech and/or sound by receiving the audio data to be outputted from the audio and video input and output data controller 305 when the control signal indicates ON.

The microphone 308 is controlled to be turned on/off by receiving the control signal from the audio and video input and output data controller 305, and sends speech and/or sound to the audio and video input and output data controller 305 by receiving the speech and/or sound from the user when the control signal indicates ON.

The open and closed state detecting sensors 309 and 310 send detected signals to the central controller 303 corresponding to the open or closed state of the side frames 104. The open and closed state detecting sensors 309 and 310 are controlled by receiving the starting up signal or the stopping signal from the central controller 303.

The wearing state detecting sensors 311, 312 and 313 are turned on/off by receiving the starting up signal or the stopping signal from the central controller 303. And the wearing state detecting sensor 311, 312 and 313 send signals detected corresponding to the wearing states of the glasses type display 101 by the user to the central controller 303.

Next, referring to the drawings, the operation of each section in the structure shown in FIG. 3 is explained.

Figure 4:
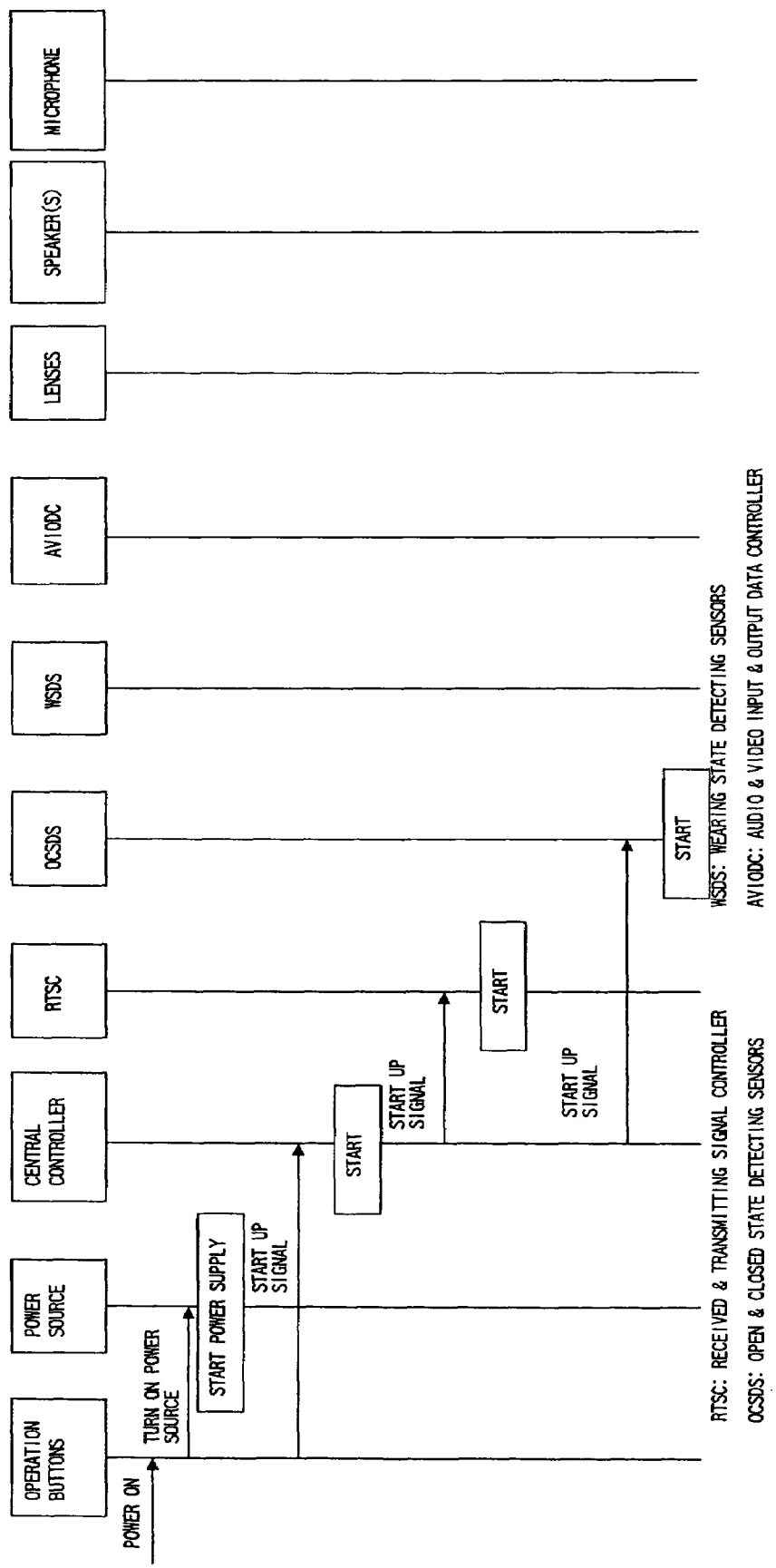
FIG. 4 is a sequence chart showing the first operation sequence at a first embodiment of the present invention.

FIG. 4 is a sequence chart showing the first operation sequence at the first embodiment of the present invention.

This first operation sequence shows the operation from turning on the power source 302 by the user to starting up the open and closed state detecting sensors 309 and 310. That is, this operation sequence signifies the operation from the power off state to the state A shown in FIG. 2.

First, the power source 302 is turned on by the user operation on the operation buttons 301, and the power supply is started. And also a starting up signal is sent to the central controller 303 by the user operation on the operation buttons 301, and the central controller 303 is started up. The central controller 303 sends a starting up signal to the received and transmitting signal controller 304, and the received and transmitting signal controller 304 is started up. The central controller 303 also sends a starting up signal to the open and closed state detecting sensors 309 and 310 disposed at the hinges, and the open and closed state detecting sensors 309 and 310 are started up.

Figure 5:
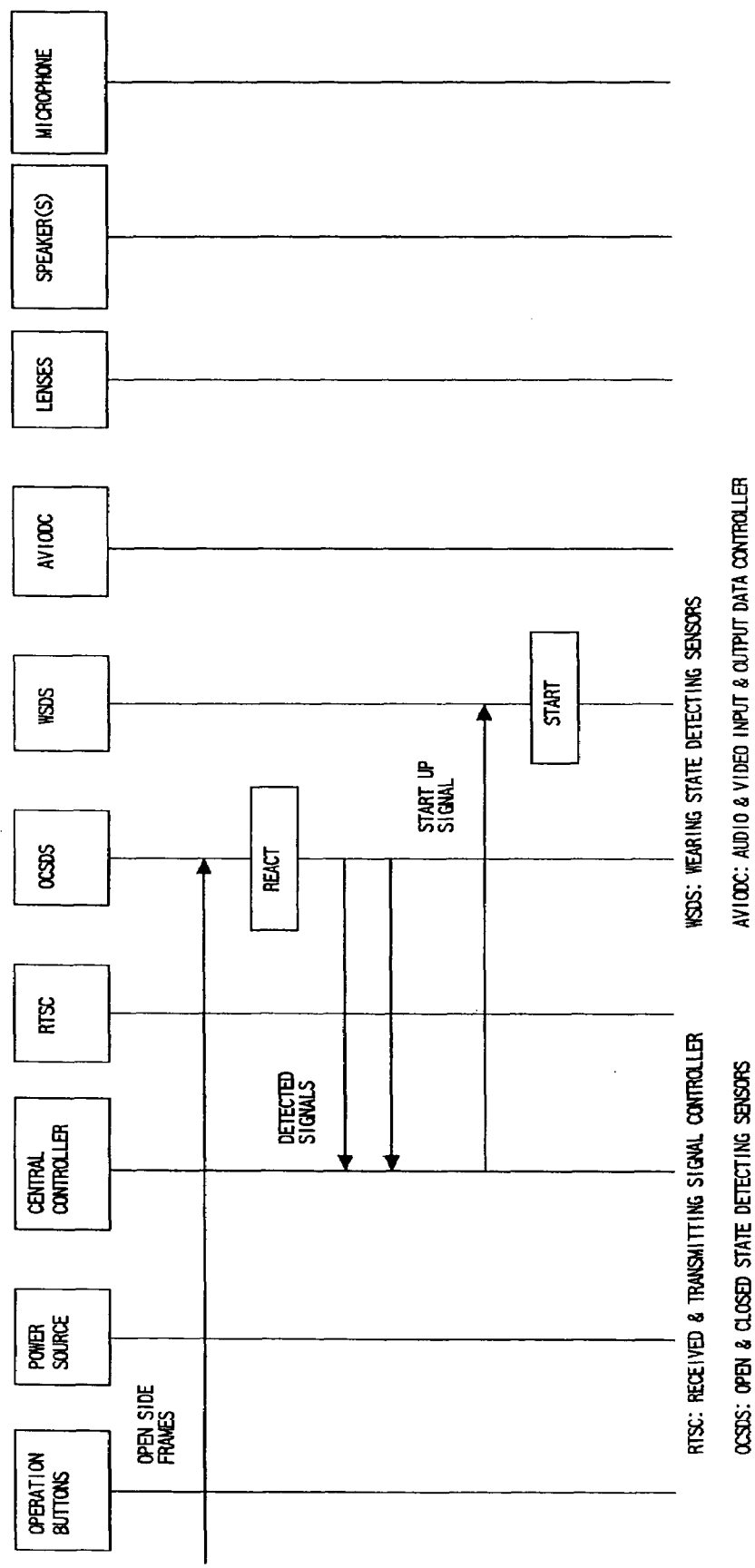
FIG. 5 is a sequence chart showing the second operation sequence at the first embodiment of the present invention.

FIG. 5 is a sequence chart showing the second operation sequence at the first embodiment of the present invention. This second operation sequence shows the operation from opening the side frames 104 by the user to starting up the wearing state detecting sensors 311, 312 and 313. That is, this operation sequence signifies the operation from the state A to the state B shown in FIG. 2.

First, the open and closed state detecting sensors 309 and 310 react by opening the side frames 104 by the user, and send the detected signals that the side frames 104 were opened to the central controller 303. The central controller starts up the wearing state detecting sensor 311, 312 and 313 by sending a starting up signal.

Figure 6:
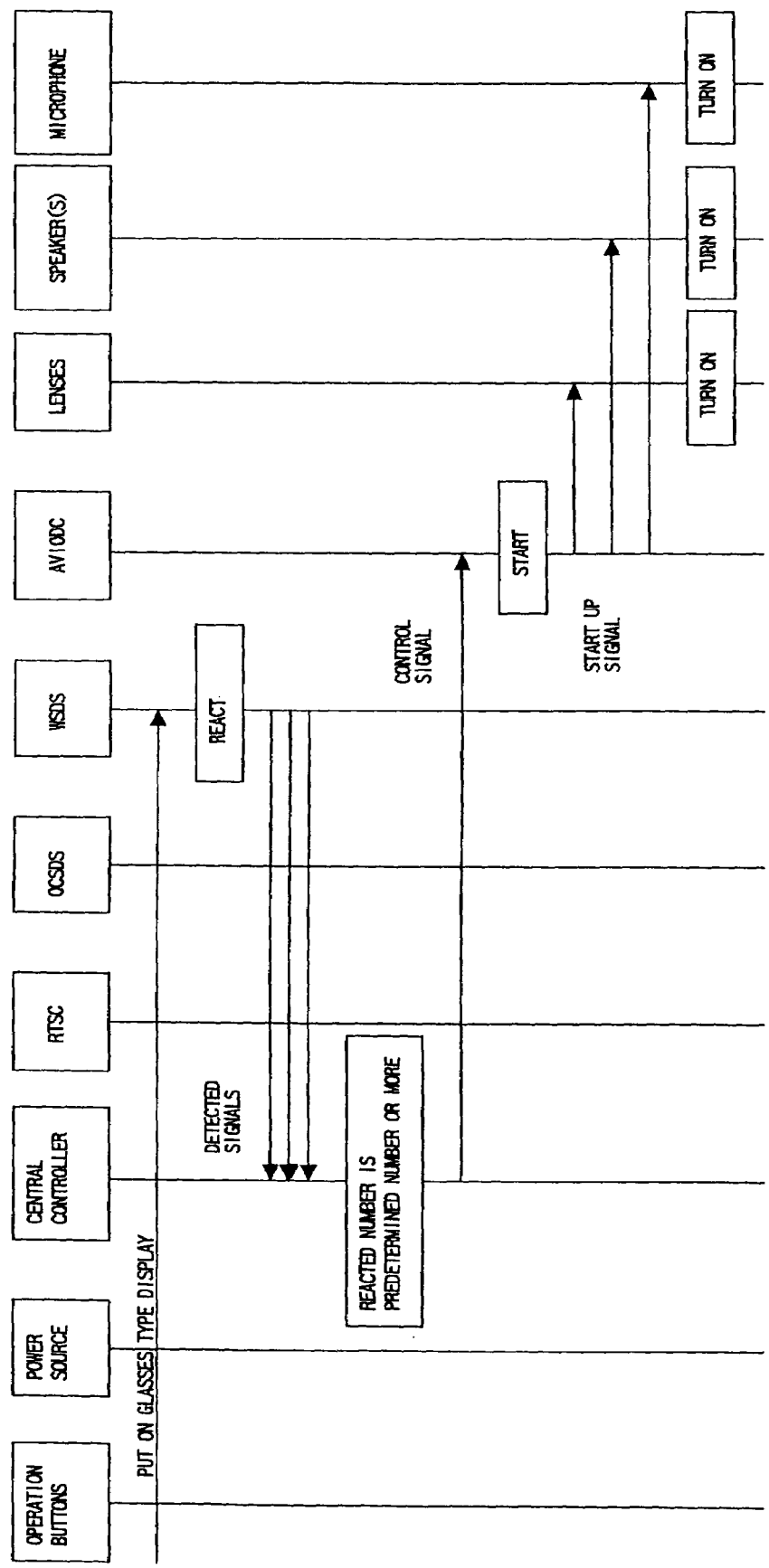
FIG. 6 is a sequence chart showing the third operation sequence at the first embodiment of the present invention.

FIG. 6 is a sequence chart showing the third operation sequence at the first embodiment of the present invention. This third operation sequence shows the operation from putting on the glasses type display 101 by the user to starting up the audio and video input and output data controller 305 and turning on the lenses 306, the speaker(s) 307 and the microphone 308. That is, this operation sequence signifies the operation from the state B to the state C shown in FIG. 2.

After the user put on the glasses type display 101, in case that detected signals were sent to the central controller 303 from the reacted wearing state detecting sensors, in which the reacted number is the predetermined number or more in the wearing state detecting sensors 311, 312 and 313, the central controller 303 starts up the audio and video input and output data controller 305 by sending a control signal and instructs the audio and video input and output data controller 305 to send a start up signal that makes the lenses 306 turn on. At this time, the central controller 303 also instructs the audio and video input and output data controller 305 to send a start up signal that makes the speaker(s) 307 and the microphone 308 turn on.

The audio and video input and output data controller 305 sends a control signal that makes the lenses 306 turn on with video data such as images and a menu screen image to be displayed on the lenses 306 to the lenses 306. The lenses 306 display the images and the menu screen image.

At this time, the audio and video input and output data controller 305 also sends a control signal that makes the speaker(s) 307 turn on with audio signals such as speech and sound to be outputted from the speaker(s) 307 to the speaker(s) 307. The speaker(s) 307 outputs the speech and the sound. And also, the audio and video input and output data controller 305 also sends a control signal that makes the microphone 308 turn on. The microphone 308 inputs speech and/or sound.

Figure 7:
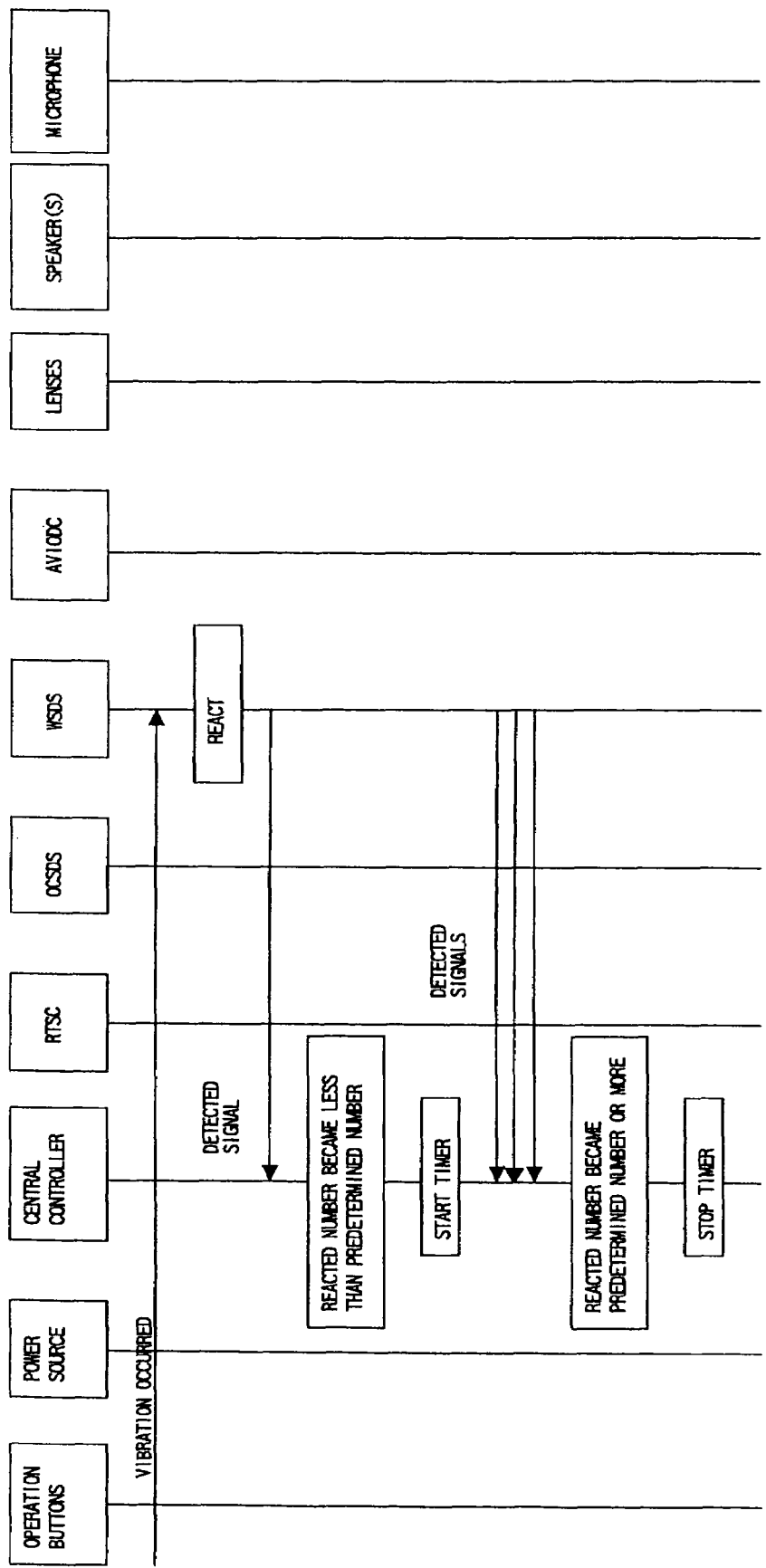
FIG. 7 is a sequence chart showing the fourth operation sequence at the first embodiment of the present invention.

FIG. 7 is a sequence chart showing the fourth operation sequence at the first embodiment of the present invention. This fourth operation sequence shows the operation from starting up the timer in the central controller 303 caused by the vibration in the glasses type display 101 to stopping the timer in the middle. That is, this operation sequence signifies the operation from the state C to the state D and returning to the state C shown in FIG. 2. This operation sequence shows the following situation. When the reaction from wearing state detecting sensors is stopped temporarily caused by the vibration at the time of walking of the user, the lenses 306, the speaker(s) 307 and the microphone 308 are not immediately turned off.

When a part of sensors in the wearing state detecting sensor 311, 312 and 313 has not reacted, caused by that the contact between the face of the user and some wearing state detecting sensor became loose by moving the position of the glasses type display 101 caused by some vibration and so on, and the number of the reacted sensors has become less than the predetermined number, the timer in the central controller 303 is started up. When the reaction from the wearing state detecting sensors recovered before the timer stops, and the number of the reacted sensors became the predetermined number or more, the timer is stopped and the state returns to the original state being the state C.

Figure 8:
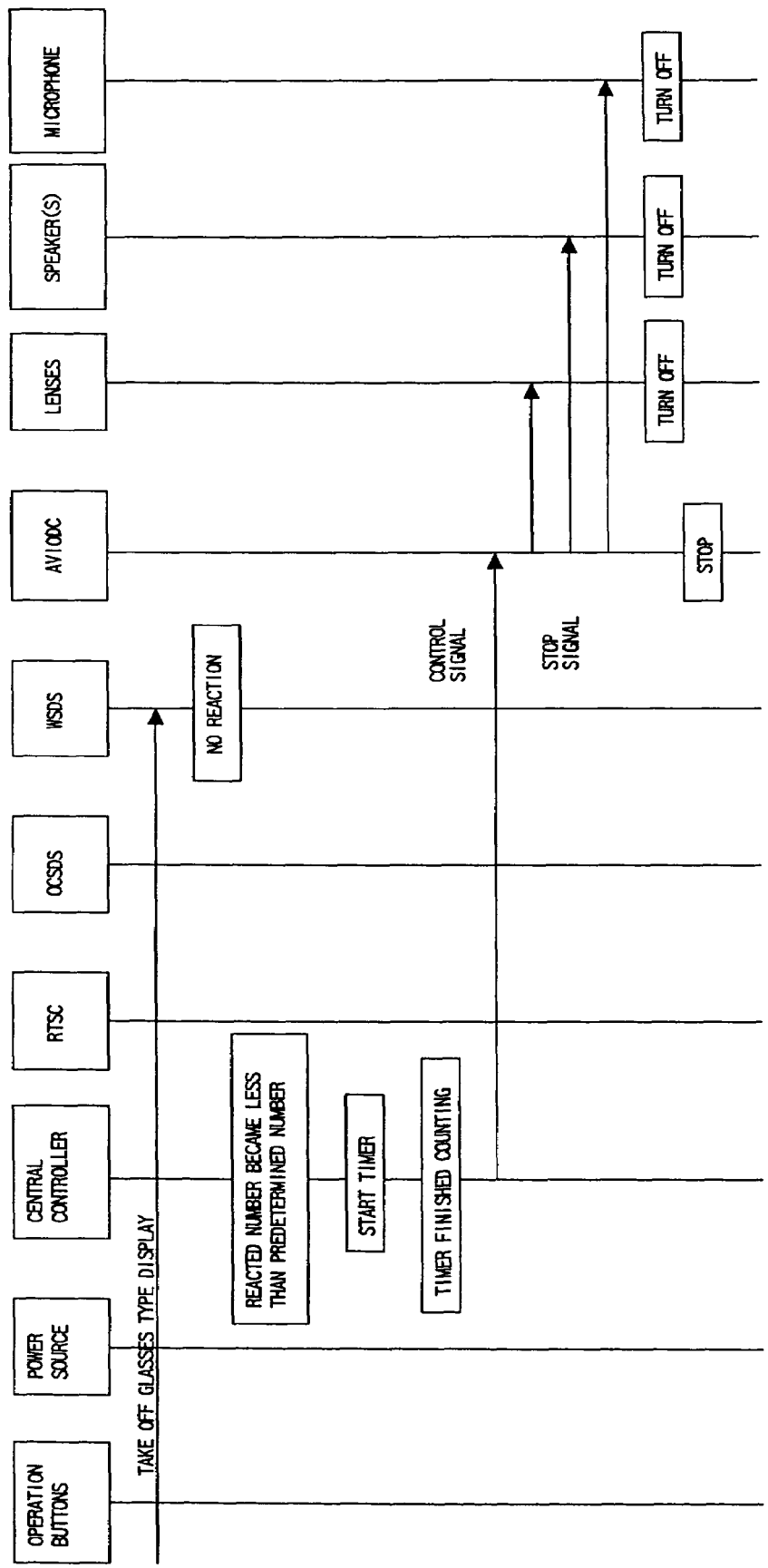
FIG. 8 is a sequence chart showing the fifth operation sequence at the first embodiment of the present invention.

FIG. 8 is a sequence chart showing the fifth operation sequence at the first embodiment of the present invention. The fifth operation sequence shows the operation from taking off the glasses type display 101 by the user to stopping the audio and video input and output data controller 305. That is, this operation sequence signifies the operation from the state C to the state D and to the state B shown in FIG. 2. This situation signifies that the user takes off the glasses type display 101 and the lenses 306, the speaker(s) 307 and the microphone 308 are turned off.

In case that the user completely took off the glasses type display 101 and the reaction from the wearing state detecting sensors 311, 312 and 313 has not recovered, the central controller 303 outputs a control signal that indicates the audio and video input and output data controller 305 to make the lenses 306 OFF. At this time, the central controller 303 also outputs a control signal that indicates the audio and video input and output data controller 305 to make the speaker(s) 307 and the microphone 308 turn off.

The audio and video input and output data controller 305 sends a control signal, which makes the lenses 306 turn off the images, to the lenses 306, and the lenses 306 turn off the images. When the control signal includes an instruction to make the input and output audio sections turn off, the audio and video input and output data controller 305 makes the speaker(s) 307 and the microphone 308 turn off. After this, the audio and video input and output data controller 305 becomes the stopping state.

At the fifth operation, the case that the user completely took off the glasses type display 101 is explained. At the fourth operation shown in FIG. 7, in which some vibration occurred, when the reaction from the wearing state detecting sensors 311, 312 and 313 has not recovered until the timer stopped by counting to the end, the operation being equal to the fifth operation is executed.

Figure 9:
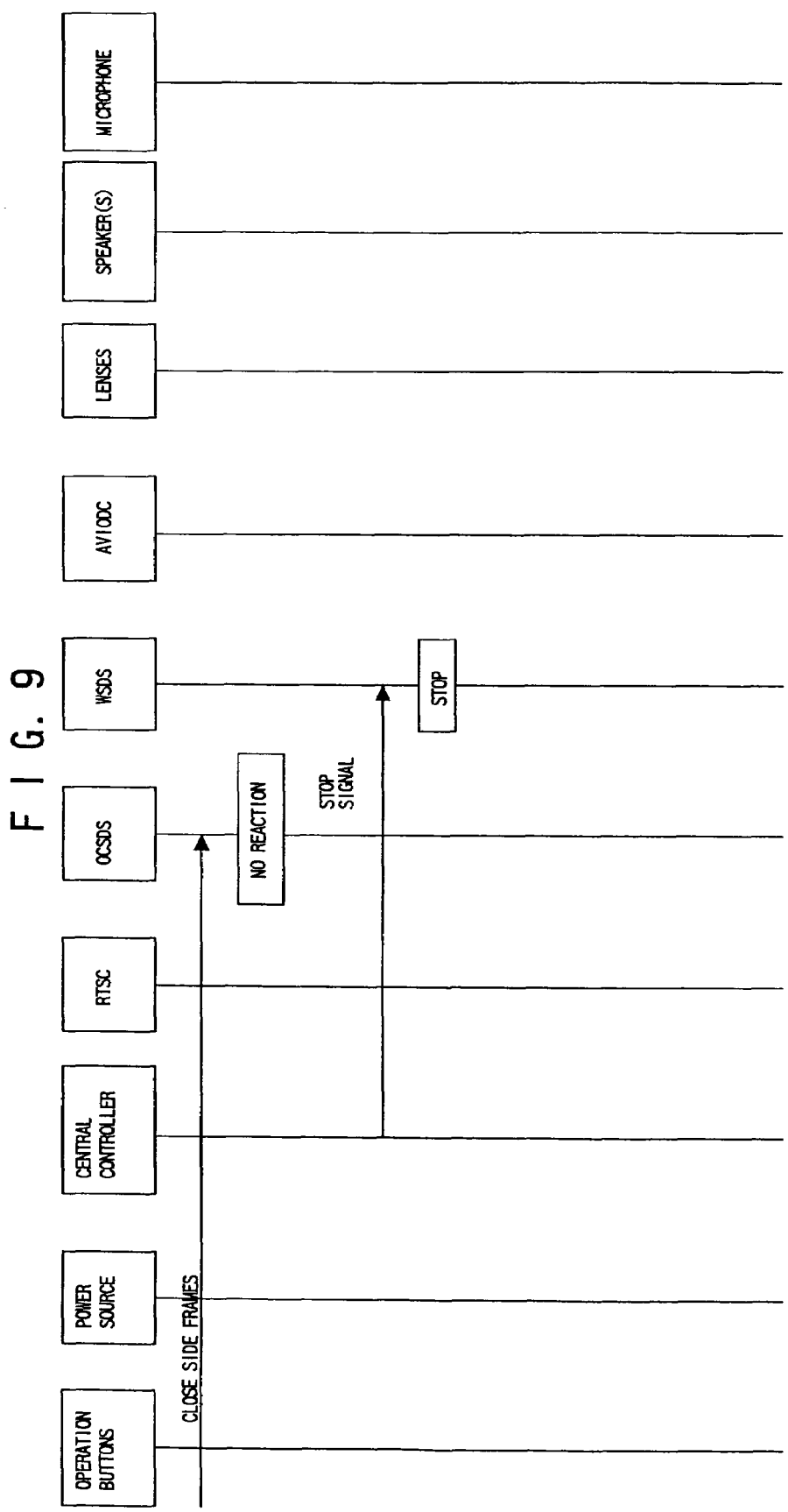
FIG. 9 is a sequence chart showing the sixth operation sequence at the first embodiment of the present invention.

FIG. 9 is a sequence chart showing the sixth operation sequence at the first embodiment of the present invention. This sixth operation sequence shows the operation from closing the side frames 104 by the user to stopping the detection by the wearing state detecting sensors 311, 312 and 313. That is, this operation sequence signifies the operation from the states B, C and D to the state A shown in FIG. 2.

In order to stop the detection by the wearing state detecting sensors 311, 312 and 313, and stop the images on the lenses 306, it is enough that the user closes the side frames 104.

Figure 10:
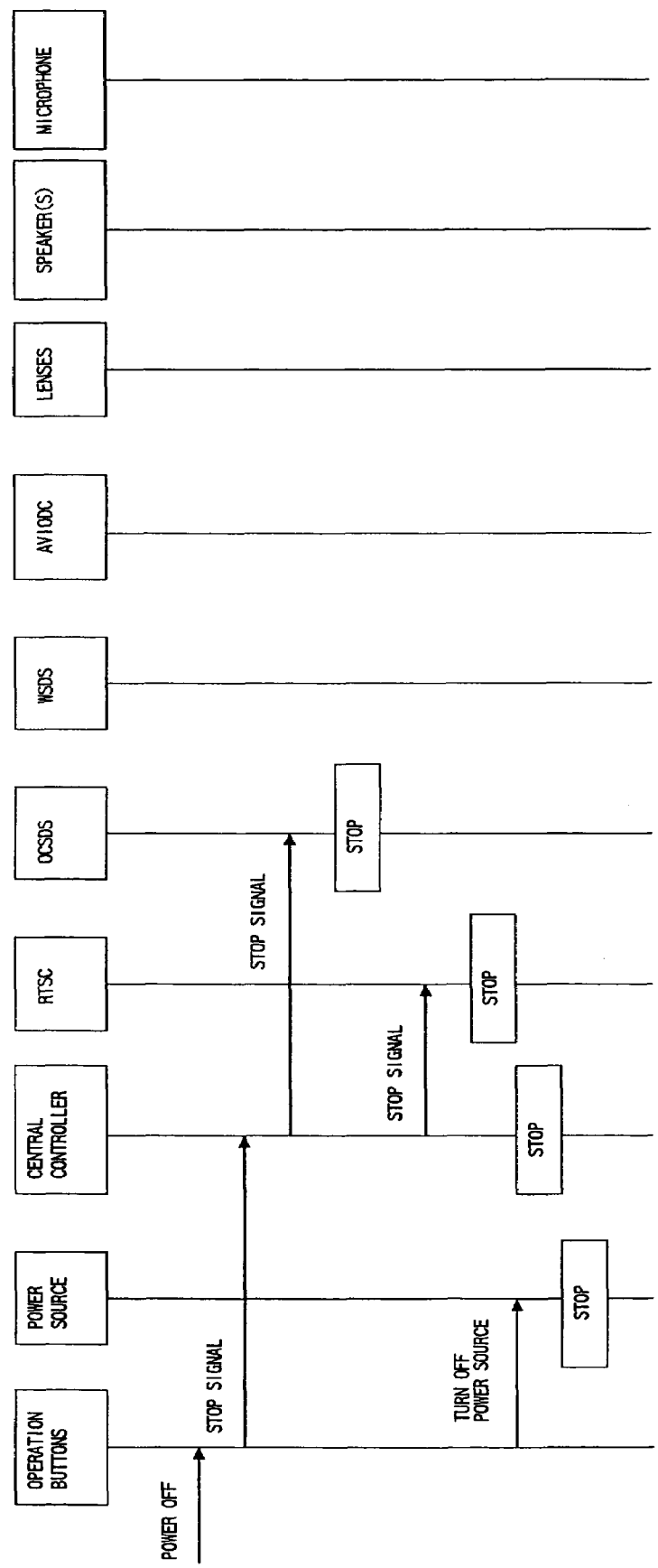
FIG. 10 is a sequence chart showing the seventh operation sequence at the first embodiment of the present invention.

FIG. 10 is a sequence chart showing the seventh operation sequence at the first embodiment of the present invention. The seventh operation sequence shows the operation that supplying the power is stopped by that the user turned off the power source 302. That is, this operation sequence signifies the operation from the state A to the power off state shown in FIG. 2.

In order to stop the operation at the central controller 303, the user operates the operation buttons 301 and controls to stop the operation of the central controller 303. By receiving this control, the central controller 303 stops the open and closed state detecting sensors 309 and 310 by sending a stopping control signal to the open and closed state detecting sensors 309 and 310. And the central controller 303 stops the received and transmitting signal controller 304 by sending a stopping control signal to the received and transmitting signal controller 304. After this, the central controller 303 itself stops, and the power source 302 is turned off by the indication from the operation buttons 301.

Next, a second embodiment of the present invention is explained. At the first embodiment, the user directly turned off the power source 302 by operating the operation buttons 301, however, at the second embodiment, the power source 302 is indirectly turned off by the operation of the user from the mobile communication terminal 106. This operation is the operation from the state A to the power off state shown in FIG. 2.

Figure 11:
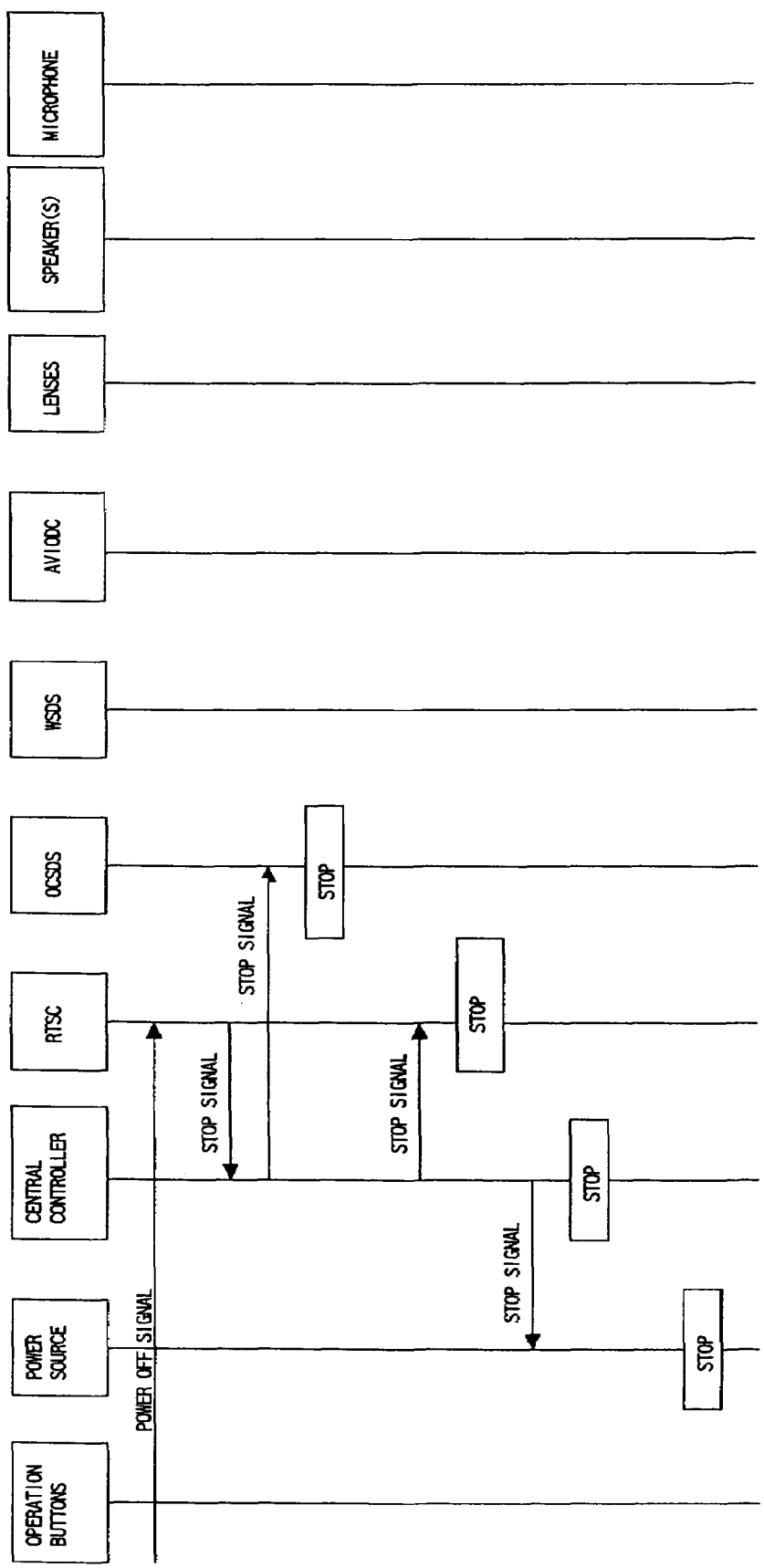
FIG. 11 is a sequence chart showing the operation sequence at a second embodiment of the present invention.

FIG. 11 is a sequence chart showing the operation sequence at the second embodiment of the present invention. As shown in FIG. 11, first, the received and transmitting signal controller 304 receives a control signal being power off signal from the mobile communication terminal 106 via the antenna, and sends this control signal to the central controller 303. The central controller 303 stops the open and closed state detecting sensors 309 and 310 by sending a stopping control signal to the open and closed state detecting sensors 309 and 310. And the central controller 303 stops the received and transmitting signal controller 304 by sending a stopping control signal to the received and transmitting signal controller 304. After this, the central controller 303 sends a stopping control signal to the power source 302, and the central controller 303 stops itself. The power source 302 that received the stopping control signal from the central controller 303 stops itself after a given amount of time.

Next, a third embodiment of the present invention is explained. At the first embodiment, the lenses 306 were turned on when the number of reacted sensors in the wearing state detecting sensors 311, 312 and 313 was the predetermined number or more. At the third embodiment, the lenses 306 are turned on when the mobile communication terminal 106 received a call from another mobile communication terminal at the on state of the power source 302. That is, in case that the mobile communication terminal 106 received a call, at the same time when the user puts on the glasses type display 101, the lenses 306 are turned on and the user starts to speak. In this case, even when the number of the reacted sensors in the wearing state detecting sensors 311, 312 and 313 is not the predetermined number or more, caused by the incomplete wearing, the lenses 306 are turned on.

Figure 12:
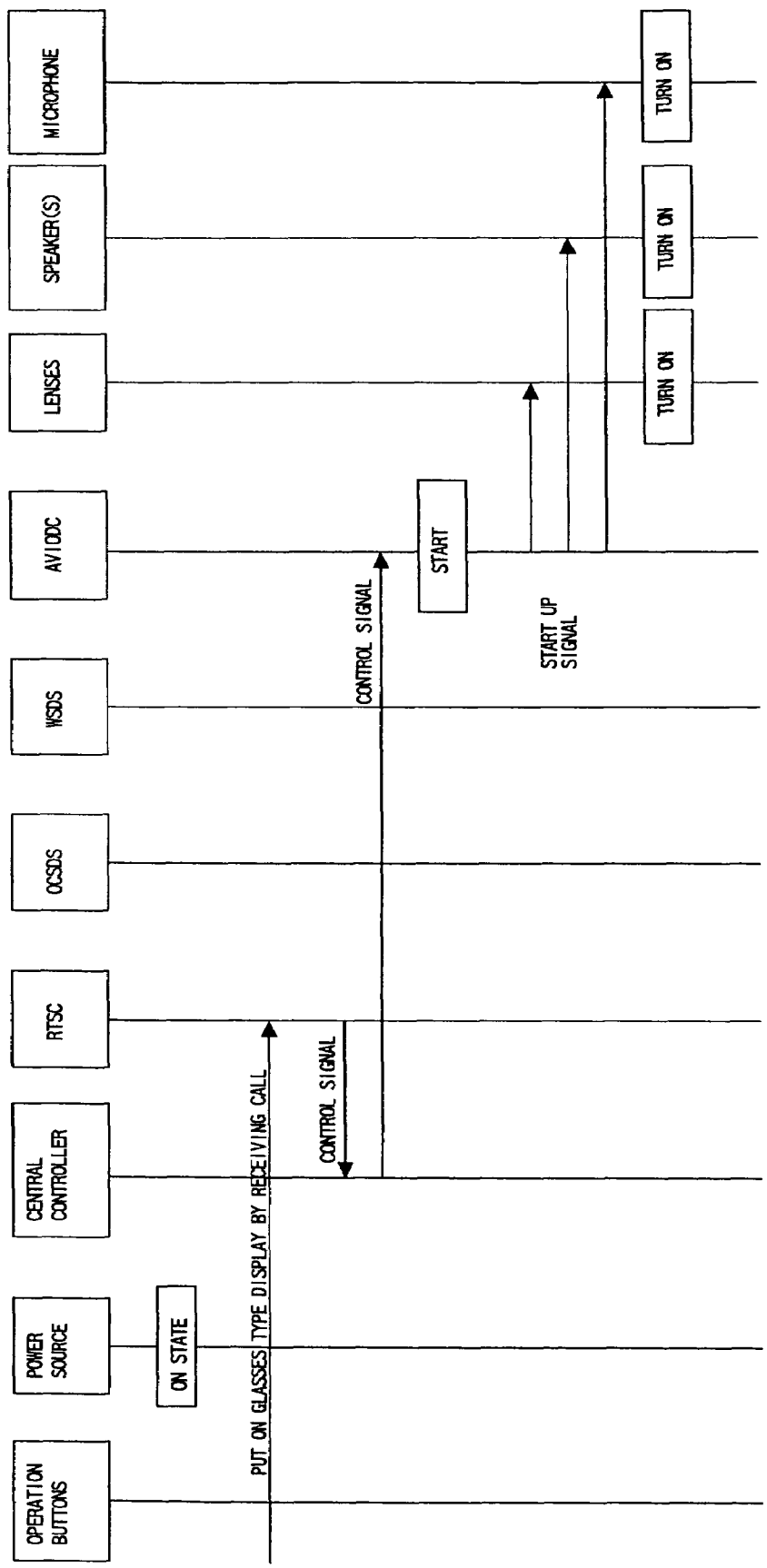
FIG. 12 is a sequence chart showing the first operation sequence at a third embodiment of the present invention.

FIG. 12 is a sequence chart showing the first operation sequence at the third embodiment of the present invention. This first operation sequence shows the operation from putting on the glasses type display 101 by the user to turning on the lenses 306, the speaker(s) 307, and the microphone 308. As shown in FIG. 12, when the user put on the glasses type display 101, the received and transmitting signal controller 304 sends a control signal to the central controller 303. The central controller 303 sends a control signal for starting up the audio and video input and output data controller 305 and making the lenses 306 turn on to the audio and video input and output data controller 305. At this time, the central controller 303 also outputs a control signal for making the audio input and output sections turn on.

The audio and video input and output data controller 305 sends a control signal for making the lenses 306 turn on to the lenses 306 with video data such as images and a menu screen image, and the lenses 306 displays the images and the menu screen image. Since the audio and video input and output data controller 305 also sends a control signal for making the audio sections turn on, the speaker(s) 307 and the microphone 308 are turned on and the user starts talking.

At the third embodiment of the present invention, when the user took off the glasses type display 101 and closed the side frames 104, at the same time, the call ends and the lenses 306 are turned off. In this case, regardless of the situation of the starting up the timer and the reaction from the wearing state detecting sensors 311, 312 and 313, the call ends and the images on the lenses 306 are turned off.

Figure 13:
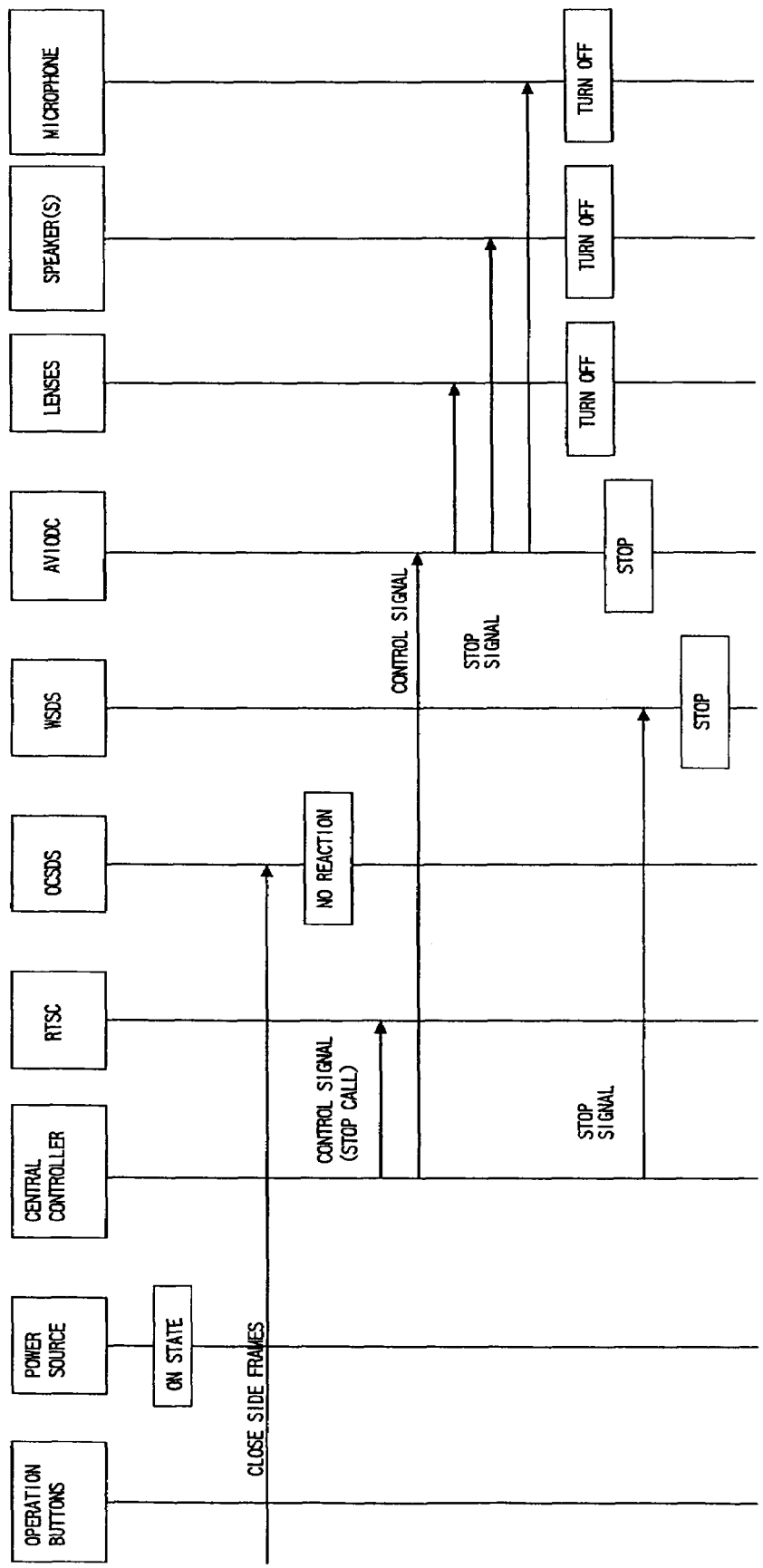
FIG. 13 is a sequence chart showing the second operation sequence at the third embodiment of the present invention.

FIG. 13 is a sequence chart showing the second operation sequence at the third embodiment of the present invention. This second operation sequence shows the operation from closing the side frames 104 by the user to turning off the lenses 306, the speaker(s) 307, and the microphone 308. As shown in FIG. 13, when the telephoning user closed the side frames 104, the central controller 303 detects the disappearance of the reaction from the open and closed state detecting sensors 309 and 310 and sends a control signal for informing the end of the call to the received and transmitting signal controller 304. The central controller 303 sends a control signal for making the lenses 306 turn off to the audio and video input and output data controller 305. At this time, the central controller 303 also outputs a control signal for making the audio input and output sections turn off.

The audio and video input and output data controller 305 sends a control signal for making the lenses 306 turn off to the lenses 306, and the lenses 306 turns off the images. Since the audio and video input and output data controller 305 also sends a control signal for making the audio sections turn off, the speaker(s) 307 and the microphone 308 are turned off. After this, the audio and video input and output data controller 305 stops the operation.

Next, a fourth embodiment of the present invention is explained. At the fourth embodiment, when the mobile communication terminal 106 received images by a videophone, a message by an e-mail, and a message by a short mail (short message service) form another mobile communication terminal, the lenses 306 are turned on at the on state of the power source 302. At this time, the images by the videophone, the message by the e-mail, and the message by the short mail can be displayed on the lenses 306 automatically. In this case, even when the number of the reacted sensors in the wearing state detecting sensors 311, 312 and 313 is not the predetermined number or more, caused by the incomplete wearing, the lenses 306 are turned on and the images and the messages are displayed on the lenses 306. As the videophone operation, the operation at the third embodiment can be used, at the fourth embodiment, the e-mail operation and the short mail operation are explained.

FIG. 14 is a sequence chart showing the operation sequence at the fourth embodiment of the present invention. As shown in FIG. 14, when the mobile communication terminal 106 received an e-mail or a short mail from another mobile communication terminal, the mobile communication terminal 106 sends this mail to the glasses type display 101. The received and transmitting signal controller 304 sends a control signal to the central controller 303 by receiving this mail. The central controller 303 sends a control signal for starting up the audio and video input and output data controller 305 and making the lenses 306 turn on to the audio and video input and output data controller 305. At this time, when the e-mail or the short mail includes audio data, the central controller 303 outputs a control signal for making the audio input and output sections turn on.

The audio and video input and output data controller 305 sends a control signal for making the lenses 306 turn on to the lenses 306 with video data such as the message of the e-mail or the short mail, and the lenses 306 displays the message. When the e-mail or the short mail includes audio data, the audio and video input and output data controller 305 sends a control signal for making the speaker(s) 307 turn on, and the speaker(s) 307 is turned on and outputs the audio signals.

Next, a fifth embodiment of the present invention is explained. At the fifth embodiment, when the mobile communication terminal 106 entered a service area of a base station for mobile communication terminals, the lenses 306 are turned on automatically at the on state of the power source 302. In this case, even when the number of the reacted sensors in the wearing state detecting sensors 311, 312 and 313 is not the predetermined number or more, caused by the incomplete wearing, the lenses 306 are turned on.

FIG. 15 is a sequence chart showing the operation sequence at the fifth embodiment of the present invention. As shown in FIG. 15, when the mobile communication terminal 106 entered a service area of a base station for mobile communication terminals, the mobile communication terminal 106 sends this information to the glasses type display 101. The received and transmitting signal controller 304 sends a control signal to the central controller 303 by receiving this information. The central controller 303 sends a control signal for starting up the audio and video input and output data controller 305 and making the lenses 306 turn on to the audio and video input and output data controller 305. At this time, the central controller 303 can output a control signal for making the audio input and output sections turn on.

The audio and video input and output data controller 305 sends a control signal for making the lenses 306 turn on to the lenses 306 with video data such as a menu screen image, and the lenses 306 displays the menu screen image. When the control signal includes an instruction regarding audio signals, the audio and video input and output data controller 305 sends a control signal for making the speaker(s) 307 and the microphone 308 turn on, and the speaker(s) 307 and the microphone 308 are turned on.

Next, embodiments using an instrument being different from the mobile communication terminal are explained.

At the first to fifth embodiments of the present invention, as an instrument in the system using the glasses type display, the mobile communication terminal is used. However, the instrument is not limited to the mobile communication terminal. At the following sixth and seventh embodiments, an instrument being different from the mobile communication terminal is used.

Next, a sixth embodiment of the present invention is explained. At the sixth embodiment, as the instrument, an information communication terminal such as a personal computer (PC), personal digital assistants (PDA), or an audio-visual instrument is used, instead of the mobile communication terminal. Further, the instrument can be connected to the Internet, a wireless local area network (LAN), or a broadcast, and the information are displayed on the glasses type display 101. The structure of the glasses type display 101 is the same structure shown in FIG. 3. Therefore, the operation turning on the lenses 306 is the same operation explained at the first embodiment. Further, as the connection between the instrument and the glasses type display 101, a wire line or a wireless line can be used.

When the glasses type display 101 received designated signals from one of the instruments mentioned above, for example, an audio-visual instrument or an information communication terminal, the lenses 306 can be turned on/off at the on state of the power source 302. In this case, even when the number of the reacted sensors in the wearing state detecting sensors 311, 312 and 313 is not the predetermined number or more, caused by the incomplete wearing, the lenses 306 are turned on. Further, regardless of the situation of the starting up the timer and the reaction from the wearing state detecting sensors 311, 312 and 313, the lenses 306 are turned off. That is, by using the designated signals, the lenses 306 are turned on/off.

FIG. 16 is a sequence chart showing the first operation sequence at the sixth embodiment of the present invention. As shown in FIG. 16, when an audio-visual instrument reproduced a CD or a DVD, or a PC is connected to the Internet, the audio-visual instrument or the PC sends these signals to the glasses type display 101. The received and transmitting signal controller 304 sends a control signal to the central controller 303 by receiving these signals. The central controller 303 sends a control signal for starting up the audio and video input and output data controller 305 and making the lenses 306 turn on to the audio and video input and output data controller 305. At this time, the central controller 303 also outputs a control signal for making the audio input and output sections turn on.

The audio and video input and output data controller 305 sends a control signal for making the lenses 306 turn on to the lenses 306 with images to be reproduced (or to be displayed) on the lenses 306, and the lenses 306 displays the images. When the control signal includes an instruction regarding audio signals, the audio and video input and output data controller 305 sends a control signal for making the speaker(s) 307 and the microphone 308 turn on, and the speaker(s) 307 and the microphone 308 are turned on.

FIG. 17 is a sequence chart showing the second operation sequence at the sixth embodiment of the present invention. As shown in FIG. 17, when the audio-visual instrument finished reproducing the CD or the DVD, or the PC finished connecting to the Internet, the audio-visual instrument or the PC sends these signals to the glasses type display 101. The received and transmitting signal controller 304 sends a control signal to the central controller 303 by receiving these signals. The central controller 303 sends a control signal for making the lenses 306 turn off to the audio and video input and output data controller 305. At this time, the central controller 303 can also output a control signal for making the audio input and output sections turn off.

The audio and video input and output data controller 305 sends a control signal for making the lenses 306 turn off to the lenses 306, and the lenses 306 tuns off the images. When the control signal includes an instruction regarding audio signals, the audio and video input and output data controller 305 sends a control signal for making the speaker(s) 307 and the microphone 308 turn off, and the speaker(s) 307 and the microphone 308 are turned off. After this, the audio and video input and output data controller 305 becomes the stopping state.

At the sixth embodiment, the following operation is possible. When the audio-visual instrument stopped sending signals, the received and transmitting signal controller 304 recognizes this situation and sends a control signal to the central controller 303. And the central controller 303 sends a control signal for making the lenses 306, the speaker(s) 307 and the microphone 308 turn off to the audio and video input and output data controller 305, and the lenses 306, the speaker(s) 307 and the microphone 308 are turned off.

Next, a seventh embodiment of the present invention is explained. At the seventh embodiment, the glasses type display itself provides functions for receiving information directly from the external instruments. That is, the glasses type display can work as it is without providing any instrument outside the display. For example, the glasses type display provides a TV tuner, a LAN adopter for connecting to a server or other PCs, a function browsing information on the Internet, or a function of mobile communication terminal, a function for reading a memory card, or a MPEG decoder. The basic structure of the glasses type display is the same structure shown in FIG. 3, however, at least one of the functions mentioned above is added to this structure. The operation making the lenses 306, the speaker(s) 307, and the microphone 308 turn on/off is the same operation at the first embodiment or the sixth embodiment.

Next, an eighth embodiment of the present invention is explained. At the embodiments mentioned above, it is assumed that the images are displayed on both the right and left lenses of the lenses 306. However, at the eighth embodiment, the images are displayed on either the right lens or the left lens of the lenses 306.

Actually, in FIG. 6, the central controller 303 sends a control signal being an instruction, which instructs to display images on either the right lens or the left lens of the lenses 306, to the audio and video input and output data controller 305. The audio and video input and output data controller 305 sends the instruction to the lenses 306, and the lenses 306 displays the images on either the right lens or the left lens based on the instruction.

Next a ninth embodiment of the present invention is explained. At the first embodiment, it was assumed that the wearing state detecting sensor 311 was disposed at the nose pad and the wearing state detecting sensors 312 and 313 were disposed at the side frames 104, that is, three sensors were disposed for detecting the wearing state of the glasses type display 101. And in case that the number of the reacted sensors in the wearing state detecting sensors 311, 312 and 313 is the predetermined number or more, the images are displayed on the lenses 306. However, at the ninth embodiment, the number of the wearing state detecting sensors is not limited to three. That is, at the ninth embodiment, the number of the wearing state detecting sensors can be increased, and also the predetermined number can be changed for detecting the wearing state more precisely. In this case, the wearing state detecting sensors are disposed at the positions where the glasses type display contacts with the face or the head of the user. Or in order to simplify the structure of the glasses type display and to decrease the power consumption, the number of the wearing state detecting sensors can be decrease.

Next, a tenth embodiment of the present invention is explained. At the tenth embodiment, the lenses 306 are turned on/off by using voice recognition. In this case, even when the number of the reacted sensors in the wearing state detecting sensors 311, 312 and 313 was not the predetermined number or more, the images are displayed on the lenses 306 at the on state of the power source 302. And regardless of the situation of the starting up the timer and the reaction from the wearing state detecting sensors 311, 312 and 313, the images on the lenses 306 are turned off at the on state of the power source 302.

FIG. 18 is a sequence chart showing the first operation sequence at the tenth embodiment of the present invention. As shown in FIG. 18, when the user made a speech to make the lenses 306 turn on by using the mobile communication terminal 106, the received and transmitting signal controller 304 receives this signal for making the lenses 306 turn on. The received and transmitting signal controller 304 sends a control signal to the central controller 303 by receiving this signal. The central controller 303 sends a control signal for starting up the audio and video input and output data controller 305 and making the lenses 306 turn on to the audio and video input and output data controller 305. At this time, the central controller 303 can also output a control signal for making the audio input and output sections turn on.

The audio and video input and output data controller 305 sends a control signal for making the lenses 306 turn on with images to be displayed to the lenses 306, and the lenses 306 displays the images. When the control signal includes an instruction regarding audio signals, the audio and video input and output data controller 305 sends a control signal for making the speaker(s) 307 and the microphone 308 turn on, and the speaker(s) 307 and the microphone 308 are turned on.

At this first operation of the tenth embodiment, when the microphone 308 is in the on state and the lenses 306 is not in the on state, the lenses 306 can be turned on by using the microphone 308. This operation is not shown in FIG. 18, however, the user inputs an instruction to the audio and video input and output data controller 305 from the microphone 308, and the audio and video input and output data controller 305 turns on the lenses 306.

FIG. 19 is a sequence chart showing the second operation sequence at the tenth embodiment of the present invention. As shown in FIG. 19, when the user made a speech to make the lenses 306 turn off by using the mobile communication terminal 106, the received and transmitting signal controller 304 receives this signal for making the lenses 306 turn off. The received and transmitting signal controller 304 sends a control signal to the central controller 303 by receiving this signal. The central controller 303 sends a control signal for making the lenses 306 turn off to the audio and video input and output data controller 305. At this time, the central controller 303 can also output a control signal for making the audio input and output sections turn off.

The audio and video input and output data controller 305 sends a control signal for making the lenses 306 turn off, and the lenses 306 are turned off. When the control signal includes an instruction regarding audio signals, the audio and video input and output data controller 305 sends a control signal for making the speaker(s) 307 and the microphone 308 turn off, and the speaker(s) 307 and the microphone 308 are turned off. After this, the audio and video input and output data controller 305 stops the operation.

At this second operation of the tenth embodiment, when the microphone 308 is in the on state and the lenses 306 is in the on state, the lenses 306 can be turned off by using the microphone 308. This operation is not shown in FIG. 19, however, the user inputs an instruction to the audio and video input and output data controller 305 from the microphone 308, and the audio and video input and output data controller 305 turns off the lenses 306.

Next, an eleventh embodiment of the present invention is explained. At the eleventh embodiment, a timer is set beforehand, and when a designated period has passed, that is, the timer has finished counting the designated period, the lenses 306 are turned on automatically at the on state of the power source 302. As the timer, the timer in the central controller 303 can be used. In this case, even when the number of the reacted sensors in the wearing state detecting sensors 311, 312 and 313 is not the predetermined number or more, caused by the incomplete wearing, the lenses 306 are turned on and the images are displayed on the lenses 306.

FIG. 20 is a sequence chart showing the operation sequence at the eleventh embodiment of the present invention. As shown in FIG. 20, when the designated period has passed, the central controller 303 sends a control signal for starting up the audio and video input and output data controller 305 and making the lenses 306 turn on to the audio and video input and output data controller 305. At this time, the control signal can include an instruction for making the audio input and output sections turn on. The audio and video input and output data controller 305 sends a control signal for making the lenses 306 turn on with the images to be displayed to the lenses 306 by receiving the control signal. The lenses 306 display the images. In case that the control signal includes a signal for making the audio input and output sections turn on, the audio and video input and output data controller 305 makes the speaker(s) 307 and the microphone 308 turn on.

When the glasses type display 101 provides a TV tuner, a TV program can be displayed on the lenses 306 by receiving the TV program, after the timer has finished counting the designated period. In this case, the seventh embodiment of the present invention can be applied.

Next, a twelfth embodiment of the present invention is explained. At the twelfth embodiment, in case that the user has not operated the glasses type display 101 for a period and a specified period has passed, even when the user wears the glasses type display 101, the lenses 306 are turned off automatically at the on state of the power source 302. Viewing the images for a long time gives a big burden to the eyes of the user. And in case that the glasses type display 101 has not been operated for a long time, this case is highly assumed that the user in a situation that the user cannot turn off the lenses 306 by having a doze. In this case, the power consumption cannot be decreased. In order to solve this problem, a timer is set beforehand, and when a designated period has passed, that is, the timer has finished counting the designated period, the lenses 306 are turned off automatically. As the timer, the timer in the central controller 303 can be used. In this case, regardless the reaction from the wearing state detecting sensors 311, 312 and 313, the lenses 306 are turned off and the images are stopped displaying on the lenses 306.

FIG. 21 is a sequence chart showing the operation sequence at the twelfth embodiment of the present invention. As shown in FIG. 21, when the designated period has passed, the central controller 303 sends a control signal for making the lenses 306 turn off to the audio and video input and output data controller 305. At this time, the control signal can include an instruction for making the audio input and output sections turn off. The audio and video input and output data controller 305 sends a control signal for making the lenses 306 turn off by receiving the control signal. And the lenses 306 are turned off. In case that the control signal includes a signal for making the audio input and output sections turn off, the audio and video input and output data controller 305 makes the speaker(s) 307 and the microphone 308 turn off. After this, the audio and video input and output data controller 305 stops the operation.

As mentioned above, according to the embodiments of the present invention, after turning on the power source and turning on the open and closed state detecting sensors, even when the side frames were opened and the wearing state detecting sensors were turned on, if the reacted number in the wearing state detecting sensors is less than the predetermined number, the lenses are not turned on. Therefore, in case that the user is walking with the glasses type display in his/her bag and the side frames were opened caused by the vibration, since the wearing state detecting sensors do not react, the lenses are not turned on. Consequently, the error operation is prevented and the unnecessary power consumption can be prevented.

And in case that the user is using the glasses type display by turning on the wearing state detecting sensors and turning on the lenses, even when the reaction from the wearing state detecting sensors stopped temporarily, caused by the vibration at the time of walking, the lenses are not immediately turned off. And the timer starts to count, and the reaction was recovered in the time limit of the timer, the lenses are in the on state continuously. Therefore, the user can enjoy viewing the images on the lenses. That is, an error operation can be avoided. Further, in case that the user leaves the on state of the display as it is, in the state that the reaction from the wearing state detecting sensors are stopped, when the timer stopped, the lenses are turned off. Therefore, the unnecessary power consumption can be avoided.

According to the embodiments of the present invention, the timer in the glasses type display can be started after the power source was turned on. And the lenses, the speaker(s), and the microphone can be turned on/off by using the timer, regardless of the reaction from the wearing state detecting sensors. Therefore, the user can enjoy viewing the images for a designated period.

According to the embodiments of the present invention, the lenses, the speaker(s), and the microphone can be turned on automatically by receiving a call or an e-mail from another mobile communication, regardless of the reaction from the wearing state detecting sensors.

According to the embodiments of the present invention, the lenses, the speaker(s), and the microphone can be turned on automatically, when the mobile communication terminal entered a service area for mobile communication terminals, regardless of the reaction from the wearing state detecting sensors.

According to the embodiments of the present invention, the glasses type display can be used with a mobile communication terminal connecting with a wire line or a wireless line. Further, the glasses type display of the present invention can be used with a PC, PDA, or an audio-visual instrument connecting with a wire line or a wireless line. And the PC or the PDA can connect to a network such as the Internet, a wireless LAN or a LAN, therefore the user can enjoy viewing the information from the network.

According to the embodiments of the present invention, the glasses type display can provide a mobile communication function, a TV tuner function, or a videophone function. Therefore, the user can use the glasses type display providing the additional function as it is.

According to the embodiments of the present invention, the number of the wearing state sensors can be decided arbitrarily. Therefore, the structure of the glasses type display has the degree of freedom.

According to the embodiments of the present invention, the lenses provide the right side lens and the left side lens, in some cases, only either the right side lens or the left side lens can be used. Therefore, the power consumption can be decreased further.

According to the embodiments of the present invention, the lenses in the glasses type display can be turned on/off from the information communication terminal (mobile communication terminal) by the voice recognition. Therefore, the operation can be further simplified.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A glasses type display, which is used with an information communication terminal by connecting with a wire line or a wireless line, comprising:
   an open and closed state detecting means that detects the open and closed state of side frames of said glasses type display;
   a wearing state detecting means that detects the wearing state of said glasses type display by a user;
   a displaying means that is disposed in a main frame of said glasses type display and displays images;
   a voice and sound outputting means that outputs voice and sound;
   a voice and sound inputting means that inputs voice and sound; and
   a timer that measures a designated period, wherein:
   when a power source became the on state in said glasses type display, said glasses type display became a first state, in which said open and closed state detecting means is the on state, and said wearing state detecting means and said displaying means and said voice and sound outputting means and said voice and sound inputting means and said timer remain in the off state,
   at said first state, when said open and closed state detecting means detected the open state of said side frames, said glasses type display became a second state, in which said wearing state detecting means is the on state, and said displaying means and said voice and sound outputting means and said voice and sound inputting means and said timer remain in the off state,
   at said second state, when the user put on said glasses type display and said wearing state detecting means detected the wearing state of said glasses type display and a predetermined displaying condition was satisfied, said glasses type display became a third state, in which said displaying means and said voice and sound outputting means and said voice and sound inputting means are the on state and said timer remains in the off state, and
   at said third state, when said predetermined displaying condition has not been satisfied, said glasses type display became a fourth state, in which said timer starts measuring said designated period.

2. A glasses type display in accordance with claim 1, wherein:
   at said fourth state, when said predetermined displaying condition was satisfied before finishing measuring said designated period by said timer, said fourth state changes to said third state.

3. A glasses type display in accordance with claim 1, wherein:
   at said fourth state, when said predetermined displaying condition was not satisfied at the time when said timer finished measuring said designated period, said fourth state changes to said second state.

4. A glasses type display in accordance with any of claims 1 to 3, wherein:
   said wearing state detecting means provides plural sensors for detecting the wearing state of said glasses type display, and
   said predetermined displaying condition is satisfied at the time when the reacted number of said sensors is a predetermined number or more in said sensors.

5. A glasses type display in accordance with claim 1, wherein:
   at said second state, when said open and closed state detecting means detected the closed state of said side frames, said second state changes to said first state.

6. A glasses type display in accordance with claim 1, wherein:
   at said third state, when said open and closed state detecting means detected the closed state of said side frames, said third state changes to said first state.

7. A glasses type display in accordance with claim 1, wherein:
   at said fourth state, when said open and closed state detecting means detected the closed state of said side frames, said fourth state changes to said first state.

8. A glasses type display in accordance with claim 1, wherein:
   at said second state, said timer is started to measure said designated period, and when said timer finished measuring said designated period, regardless of said predetermined displaying condition, said displaying means and said voice and sound outputting means and said voice and sound inputting means are turned on.

9. A glasses type display in accordance with claim 1, wherein:
   at said third state, said timer is started to measure said designated period, and when said timer finished measuring said designated period, said displaying means and said voice and sound outputting means and said voice and sound inputting means are turned off.

10. A glasses type display in accordance with claim 1, wherein:
    said information communication terminal is a mobile communication terminal and said glasses type display is in the communication state with said mobile communication terminal, and
    when said mobile communication terminal received a call from another mobile communication terminal, regardless of said predetermined displaying condition, said displaying means and said voice and sound outputting means and said voice and sound inputting means are turned on.

11. A glasses type display in accordance with claim 1, wherein:
    said information communication terminal is a mobile communication terminal and said glasses type display is in the communication state with said mobile communication terminal, and
    when said mobile communication terminal ended a speech with another mobile communication terminal, said displaying means and said voice and sound outputting means and said voice and sound inputting means are turned off.

12. A glasses type display in accordance with claim 1, wherein:
    said information communication terminal is a mobile communication terminal and said glasses type display is in the communication state with said mobile communication terminal, and when said mobile communication terminal received an e-mail from another mobile communication terminal, regardless of said predetermined displaying condition, said displaying means and said voice and sound outputting means and said voice and sound inputting means are turned on.

13. A glasses type display in accordance with claim 1, wherein:
said information communication terminal is a mobile communication terminal and said glasses type display is in the communication state with said mobile communication terminal, and
when said mobile communication terminal entered a service area for mobile communication terminals, regardless of said predetermined displaying condition, said displaying means and said voice and sound outputting means and said voice and sound inputting means are turned on.

14. A glasses type display in accordance with claim 1, wherein:
said information communication terminal is a mobile communication terminal and said glasses type display is in the communication state with said mobile communication terminal, and
when the user of said mobile communication terminal made a specified speech, it was assumed that said predetermined displaying condition was satisfied by recognizing said specified speech, and said displaying means and said voice and sound outputting means and said voice and sound inputting means are turned on.

15. A glasses type display in accordance with claim 1, wherein:
said information communication terminal is a mobile communication terminal and said glasses type display is in the communication state with said mobile communication terminal, and
when the user of said mobile communication terminal made another specified speech, by recognizing another specified speech, said displaying means and said voice and sound outputting means and said voice and sound inputting means are turned off.

16. A glasses type display in accordance with claim 1, wherein:
said information communication terminal is a communication terminal, which provides an information receiving means for receiving information from the outside directly, and said glasses type display is in the communication state with said communication terminal, and
when said glasses type display received a designated signal from said information terminal, it was assumed that said predetermined displaying condition was satisfied, and said displaying means and said voice and sound outputting means and said voice and sound inputting means are turned on.

17. A glasses type display in accordance with claim 1, wherein:
said information communication terminal is a communication terminal, which provides an information receiving means for receiving information from the outside directly, and said glasses type display is in the communication state with said communication terminal, and
when said glasses type display received another designated signal from said information terminal, said displaying means and said voice and sound outputting means and said voice and sound inputting means are turned off.

18. A glasses type display in accordance with claim 1, wherein:
said information communication terminal is an audio-visual instrument, which provides an information receiving means for receiving information from the outside directly, and said glasses type display is in the communication state with said audio-visual instrument, and
when said glasses type display received a designated signal from said audio-visual instrument, it was assumed that said predetermined displaying condition was satisfied, and said displaying means and said voice and sound outputting means and said voice and sound inputting means are turned on.

19. A glasses type display in accordance with claim 1, wherein:
said information communication terminal is an audio-visual instrument, which provides an information receiving means for receiving information from the outside directly, and said glasses type display is in the communication state with said audio-visual instrument, and
when said glasses type display received another designated signal from said audio-visual instrument, said displaying means and said voice and sound outputting means and said voice and sound inputting means are turned off, or
when signals from said audio-visual instrument have not been received at said glasses type display, said displaying means and said voice and sound outputting means and said voice and sound inputting means are turned off.

20. A glasses type display in accordance with claim 1, wherein:
said glasses type display provides said information communication terminal inside of said glasses type display, instead of connecting to said information communication terminal.

21. A glasses type display controlling method in a glasses type display, which is used with an information communication terminal by connecting with a wire line or a wireless line, wherein:
said glasses type display, comprising:
an open and closed state detecting means that detects the open and closed state of side frames of said glasses type display;
a wearing state detecting means that detects the wearing state of said glasses type display by a user;
a displaying means that is disposed in a main frame of said glasses type display and displays images;
a voice and sound outputting means that outputs voice and sound;
a voice and sound inputting means that inputs voice and sound; and
a timer that measures a designated period, wherein:
said glasses type display controlling method, comprising the steps of:
making said glasses type display a first state, in which said open and closed state detecting means is the on state, and said wearing state detecting means and said displaying means and said voice and sound outputting means and said voice and sound inputting means and said timer remain in the off state, when a power source became the on state in said glasses type display;

making said glasses type display a second state, in which said wearing state detecting means is the on state, and said displaying means and said voice and sound outputting means and said voice and sound inputting means and said timer remain in the off state, when said open and closed state detecting means detected the open state of said side frames at said first state;

making said glasses type display a third state, in which said displaying means and said voice and sound outputting means and said voice and sound inputting means are the on state and said timer remains in the off state, when the user put on said glasses type display and said wearing state detecting means detected the wearing state of said glasses type display and a predetermined displaying condition was satisfied at said second state; and making said glasses type display a fourth state, in which said timer starts measuring said designated period, when said predetermined displaying condition has not been satisfied at said third state.

22. A glasses type display controlling method in accordance with claim 21, further comprising the steps of:

changing said fourth state to said third state, when said predetermined displaying condition was satisfied before finishing measuring said designated period by said timer at said fourth state; and changing said fourth state to said second state, when said predetermined displaying condition was not satisfied at the time when said timer finished measuring said designated period at said fourth state.

23. A glasses type display controlling method in accordance with claims 21 or 22, wherein:

said wearing state detecting means provides plural sensors for detecting the wearing state of said glasses type display, and said predetermined displaying condition is satisfied at the time when the reacted number of said sensors is a predetermined number or more in said sensors.

24. A glasses type display controlling method in accordance with claim 21, further comprising the steps of:

changing said second state to said first state, when said open and closed state detecting means detected the closed state of said side frames at said second state;

changing said third state to said first state, when said open and closed state detecting means detected the closed state of said side frames at said third state; and changing said fourth state to said first state, when said open and closed state detecting means detected the closed state of said side frames at said fourth state.

25. A glasses type display controlling method in accordance with claim 21, further comprising the steps of:

starting said timer to measure said designated period at said second state; and turning on said displaying means and said voice and sound outputting means and said voice and sound inputting means, by assuming that said predetermined displaying condition was satisfied, when said timer finished measuring said designated period.

26. A glasses type display controlling method in accordance with claim 21, further comprising the steps of:

starting said timer to measure said designated period at said third state; and turning off said displaying means and said voice and sound outputting means and said voice and sound inputting means, when said timer finished measuring said designated period.

27. A glasses type display controlling method in accordance with claim 21, wherein:

said information communication terminal is a mobile communication terminal and said glasses type display is in the communication state with said mobile communication terminal, and when said mobile communication terminal received a call from another mobile communication terminal, regardless of said predetermined displaying condition, said displaying means and said voice and sound outputting means and said voice and sound inputting means are turned on.

28. A glasses type display controlling method in accordance with claim 21, wherein:

said information communication terminal is a mobile communication terminal and said glasses type display is in the communication state with said mobile communication terminal, and when said mobile communication terminal ended a speech with another mobile communication terminal, said displaying means and said voice and sound outputting means and said voice and sound inputting means are turned off.

29. A glasses type display controlling method in accordance with claim 21, wherein:

said information communication terminal is a mobile communication terminal and said glasses type display is in the communication state with said mobile communication terminal, and when said mobile communication terminal received an e-mail from another mobile communication terminal, regardless of said predetermined displaying condition, said displaying means and said voice and sound outputting means and said voice and sound inputting means are turned on.

30. A glasses type display controlling method in accordance with claim 21, wherein:

said information communication terminal is a mobile communication terminal and said glasses type display is in the communication state with said mobile communication terminal, and when said mobile communication terminal entered a service area for mobile communication terminals, regardless of said predetermined displaying condition, said displaying means and said voice and sound outputting means and said voice and sound inputting means are turned on.

31. A glasses type display controlling method in accordance with claim 21, wherein:

said information communication terminal is a mobile communication terminal and said glasses type display is in the communication state with said mobile communication terminal, and when the user of said mobile communication terminal made a specified speech, it was assumed that said predetermined displaying condition was satisfied by recognizing said specified speech, and said displaying means and said voice and sound outputting means and said voice and sound inputting means are turned on.

32. A glasses type display controlling method in accordance with claim 21, wherein:

said information communication terminal is a mobile communication terminal and said glasses type display is in the communication state with said mobile communication terminal, and when the user of said mobile communication terminal made another specified speech, by recognizing another specified speech, said displaying means and said voice and sound outputting means and said voice and sound inputting means are turned off.

33. A glasses type display controlling method in accordance with claim 21, wherein:

said information communication terminal is a communication terminal, which provides an information receiving means for receiving information from the outside directly, and said glasses type display is in the communication state with said communication terminal, and when said glasses type display received a designated signal from said information terminal, it was assumed that said predetermined displaying condition was satisfied, and said displaying means and said voice and sound outputting means and said voice and sound inputting means are turned on.

34. A glasses type display controlling method in accordance with claim 21, wherein:

said information communication terminal is a communication terminal, which provides an information receiving means for receiving information from the outside directly, and said glasses type display is in the communication state with said communication terminal, and when said glasses type display received another designated signal from said information terminal, said displaying means and said voice and sound outputting means and said voice and sound inputting means are turned off.

35. A glasses type display controlling method in accordance with claim 21, wherein:

said information communication terminal is an audio-visual instrument, which provides an information receiving means for receiving information from the outside directly, and said glasses type display is in the communication state with said audio-visual instrument, and when said glasses type display received a designated signal from said audio-visual instrument, it was assumed that said predetermined displaying condition was satisfied, and said displaying means and said voice and sound outputting means and said voice and sound inputting means are turned on.

36. A glasses type display controlling method in accordance with claim 21, wherein:

said information communication terminal is an audio-visual instrument, which provides an information receiving means for receiving information from the outside directly, and said glasses type display is in the communication state with said audio-visual instrument, and when said glasses type display received another designated signal from said audio-visual instrument, said displaying means and said voice and sound outputting means and said voice and sound inputting means are turned off, or when signals from said audio-visual instrument have not been received at said glasses type display, said displaying means and said voice and sound outputting means and said voice and sound inputting means are turned off.

37. A glasses type display controlling method in accordance with claim 21, wherein:

said glasses type display provides said information communication terminal inside of said glasses type display, instead of connecting to said information communication terminal.

\* \* \* \* \*